United States Patent
Ozawa

(10) Patent No.: US 10,337,533 B2
(45) Date of Patent: Jul. 2, 2019

(54) CONNECTING STRUCTURE OF ELECTROMAGNETIC VALVE AND HYDRAULIC PRESSURE CONTROL DEVICE

(71) Applicant: Yazaki Corporation, Tokyo (JP)

(72) Inventor: Keisuke Ozawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/415,392

(22) Filed: Jan. 25, 2017

(65) Prior Publication Data
US 2017/0218982 A1 Aug. 3, 2017

(30) Foreign Application Priority Data

Feb. 2, 2016 (JP) .................................. 2016-017709
Jun. 28, 2016 (JP) .................................. 2016-128046

(51) Int. Cl.
*F16K 31/06* (2006.01)
*H01R 13/42* (2006.01)
(Continued)

(52) U.S. Cl.
CPC .......... *F15B 13/044* (2013.01); *F16K 27/003* (2013.01); *F16K 27/029* (2013.01); *F15B 2211/50* (2013.01)

(58) Field of Classification Search
CPC ........................... F16K 31/0655; F16K 27/029
(Continued)

(56) References Cited

U.S. PATENT DOCUMENTS 3,955,124 A * 5/1976 Jones ..................... H01R 33/72
324/94
4,029,953 A * 6/1977 Natoli ...................... B60Q 3/14
362/382
(Continued)

FOREIGN PATENT DOCUMENTS

CN 101003253 A 7/2007
CN 103174866 A 6/2013
(Continued)

OTHER PUBLICATIONS

The extended European search report for the related European Patent Application No. 17153987.7 dated Jun. 20, 2017.
(Continued)

*Primary Examiner* — Seth W. Mackay-Smith
(74) *Attorney, Agent, or Firm* — Kenealy Vaidya LLP

(57) ABSTRACT

An connecting structure of an electromagnetic valve includes: a first connecting structure body that prohibits a relative movement between a hydraulic pressure circuit body and an electromagnetic valve in an axis line direction; a second connecting structure body that prohibits a relative movement therebetween in a plane orthogonal to the axis line direction; a third connecting structure body that prohibits a relative rotation about the axis therebetween; and a connection body that is prohibited from moving relatively to the hydraulic pressure circuit body, wherein the first connecting structure body includes a first target connection tool that is provided in an accommodation body and a first connection tool that locks the first target connection tool in the axis line direction at a wall portion constituting an accommodation space.

20 Claims, 25 Drawing Sheets

(51) Int. Cl.
*F16K 27/00* (2006.01)
*F15B 13/044* (2006.01)
*F16K 27/02* (2006.01)

(58) Field of Classification Search
USPC ..................... 251/129.15; 439/546
See application file for complete search history.

(56) References Cited

U.S. PATENT DOCUMENTS

| | | | | |
|---|---|---|---|---|
| 4,758,181 A * | 7/1988 | Reedy | .................... | H01R 33/09 439/333 |
| 5,685,730 A * | 11/1997 | Cameron | ............. | H01R 13/625 439/333 |
| 5,704,806 A * | 1/1998 | Post | .................... | H01R 13/625 439/335 |
| 5,895,027 A | 4/1999 | Yagi | | |
| 6,036,522 A * | 3/2000 | Holzer | ................ | F21V 19/0005 439/306 |
| 6,144,275 A * | 11/2000 | Hirata | ....................... | H01F 7/06 251/129.15 |
| 6,155,874 A * | 12/2000 | Endo | ....................... | H01R 13/24 439/546 |
| 6,439,265 B1 * | 8/2002 | Gruschwitz et al. | ... | B60T 8/363 137/601.14 |
| 6,551,133 B2 * | 4/2003 | Tsukamoto | ............ | H01R 33/09 439/549 |
| 7,044,751 B2 * | 5/2006 | Takanashi | ............. | B60T 8/3675 439/247 |
| 7,455,543 B2 * | 11/2008 | Natter | .................. | H01R 13/625 285/85 |
| 7,628,632 B2 * | 12/2009 | Holland | ............. | H01R 13/6273 439/309 |
| 9,531,112 B2 * | 12/2016 | Kato | .................... | H01R 13/625 |
| 2004/0134549 A1 | 7/2004 | Albert | | |
| 2005/0282426 A1 | 12/2005 | Nagashima et al. | | |
| 2007/0175518 A1 | 8/2007 | Vincent et al. | | |
| 2010/0273342 A1 * | 10/2010 | Hankins | ............... | H01R 13/625 439/332 |
| 2014/0203545 A1 | 7/2014 | Hasunuma et al. | | |
| 2016/0076663 A1 | 3/2016 | Umeda et al. | | |

FOREIGN PATENT DOCUMENTS

| | | |
|---|---|---|
| DE | 197 25 289 A1 | 12/1998 |
| JP | 7-12676 U | 3/1995 |
| JP | 8-51019 A | 2/1996 |
| JP | 9-306558 A | 11/1997 |
| JP | 11-8023 A | 1/1999 |
| JP | 2002-31263 A | 1/2002 |
| JP | 2006-4840 A | 1/2006 |
| JP | 2007-198595 A | 8/2007 |
| JP | 2009-181709 A | 8/2009 |
| JP | 2010-216552 A | 9/2010 |
| JP | 2012-188089 A | 10/2012 |
| JP | 2013-213524 A | 10/2013 |
| JP | 2014-142023 A | 8/2014 |
| JP | 2016-61329 A | 4/2016 |

OTHER PUBLICATIONS

The European Office Action for the related European Patent Application No. 17153987.7 dated Feb. 5, 2018.
The Japanese Office Action for the related Japanese Patent Application No. 2016-128046 dated Jul. 31, 2018.
The Chinese Office Action for the related Chinese Patent Application No. 201710060464.5 dated Aug. 29, 2018.
The Japanese Office Action for the related Japanese Patent Application No. 2016-128046 dated Dec. 4, 2018.
The Chinese Office Action for the related Chinese Patent Application No. 201710060464.5 dated Apr. 19, 2019.

* cited by examiner

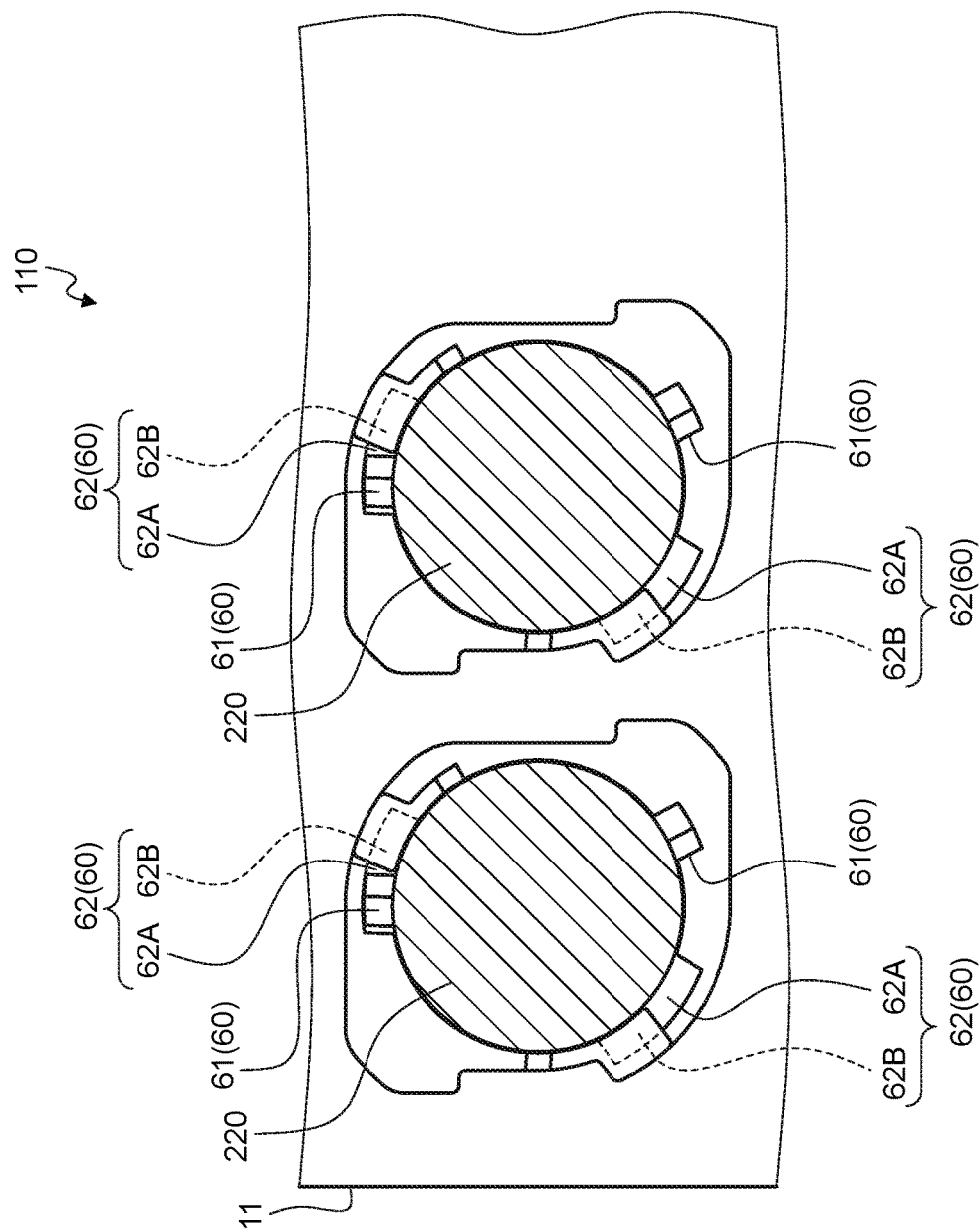

CONNECTING STRUCTURE OF ELECTROMAGNETIC VALVE AND HYDRAULIC PRESSURE CONTROL DEVICE

CROSS-REFERENCE TO RELATED APPLICATION(S)

The present application claims priority to and incorporates by reference the entire contents of Japanese Patent Application No. 2016-017709 filed in Japan on Feb. 2, 2016 and Japanese Patent Application No. 2016-128046 filed in Japan on Jun. 28, 2016.

BACKGROUND OF THE INVENTION

1. Field of the Invention

The present invention relates to a connecting structure of an electromagnetic valve and a hydraulic pressure control device.

2. Description of the Related Art

Conventionally, there is known a technology involving with a hydraulic pressure control device including a hydraulic pressure circuit body that is provided with a hydraulic pressure circuit causing a hydraulic liquid of a control target to flow therethrough and an electromagnetic valve that is attached to the hydraulic pressure circuit body to adjust a flow rate of a working fluid in the hydraulic pressure circuit (refer to Japanese Patent Application Laid-open Nos. H11-008023, 2010-216552, 2002-31263, H09-306558, 2009-181709, 2006-004840, and H08-051019).

Incidentally, when the hydraulic pressure control device is mounted on a vehicle such as an automobile, various input loads act on the electromagnetic valve in a traveling state. Thus, it is desirable to keep a predetermined connecting state of the electromagnetic valve with respect to the hydraulic pressure circuit body even when the input load is applied thereto so that the accuracy of adjusting the flow rate of the working fluid is kept. Then, the hydraulic pressure control device of the related art has a room for improvement of keeping a predetermined connecting state of the electromagnetic valve with respect to the hydraulic pressure circuit body.

SUMMARY OF THE INVENTION

An object of the present invention is to provide a connecting structure of an electromagnetic valve and a hydraulic pressure control device capable of keeping a predetermined connection state of the electromagnetic valve.

In order to achieve the above mentioned object, a connecting structure of an electromagnetic valve according to one aspect of the present invention includes: a first connecting structure body that prohibits a relative movement between a hydraulic pressure circuit body and an electromagnetic valve in an axis line direction of a center axis when a cylindrical or an annular accommodation body of the electromagnetic valve capable of adjusting a flow rate of a working fluid in a hydraulic pressure circuit is inserted in the axis line direction to be accommodated into a columnar accommodation space of the hydraulic pressure circuit body including the hydraulic pressure circuit causing a working fluid of a control target to flow therethrough and the accommodation space communicating the hydraulic pressure circuit with an outside; a second connecting structure body that prohibits a relative movement between the hydraulic pressure circuit body and the electromagnetic valve in a plane orthogonal to the axis line direction when the accommodation body is accommodated in the accommodation space; a third connecting structure body that prohibits a relative rotation about the center axis between the hydraulic pressure circuit body and the electromagnetic valve when the accommodation body is accommodated in the accommodation space; and a connection body that is prohibited from moving relatively to the hydraulic pressure circuit body, wherein the first connecting structure body includes a first target connection tool that is provided at one of the accommodation body and a wall portion constituting the accommodation space, and a first connection tool that is provided at the other thereof to lock the first target connection tool in the axis line direction when the accommodation body is accommodated in the accommodation space, the second connecting structure body includes a second target connection tool that is provided at one of the accommodation body and the wall portion constituting the accommodation space, and a second connection tool that is provided at the other thereof and prohibits a relative movement of the second target connection tool in a plane orthogonal to the axis line direction when the accommodation body is accommodated in the accommodation space, and the third connecting structure body includes a third target connection tool that is provided at one of the connection body and the accommodation body, and a third connection tool that is provided at the other thereof and locks the third target connection tool when the accommodation body is accommodated in the accommodation space to prohibit a relative rotation about the center axis of the electromagnetic valve with respect to the hydraulic pressure circuit body.

In order to achieve the above mentioned object, a connecting structure of an electromagnetic valve according to another aspect of the present invention includes: at least two first connecting structure bodies that prohibit a relative movement between a hydraulic pressure circuit body and an electromagnetic valve in an axis line direction of a center axis when a cylindrical or an annular accommodation body of the electromagnetic valve capable of adjusting a flow rate of a working fluid in a hydraulic pressure circuit is inserted in the axis line direction to be accommodated into a columnar accommodation space of the hydraulic pressure circuit body including the hydraulic pressure circuit causing a working fluid of a control target to flow therethrough and the accommodation space communicating the hydraulic pressure circuit with an outside; a second connecting structure body that prohibits a relative movement between the hydraulic pressure circuit body and the electromagnetic valve in a plane orthogonal to the axis line direction when the accommodation body is accommodated in the accommodation space; at least two third connecting structure bodies that prohibit a relative rotation about the center axis between the hydraulic pressure circuit body and the electromagnetic valve when the accommodation body is accommodated in the accommodation space; and a connection body that is prohibited from moving relatively to the hydraulic pressure circuit body, wherein the first connecting structure body includes a first target connection tool that is provided at one of the accommodation body and a wall portion constituting the accommodation space, and a first connection tool that is provided at the other thereof to lock the first target connection tool in the axis line direction when the accommodation body is accommodated in the accommodation space, the second connecting structure body includes a second target connection tool that is provided at one of the accommodation body and the wall portion constituting the accommodation space, and a second connection tool that is provided at the other thereof and prohibits a relative movement of the second target connection tool in a plane orthogonal to the axis line direction when the accommodation body is accommodated in the accommodation space, and the third connecting structure body includes a third target connection tool that is provided at one of the connection body and the accommodation body, and a third connection tool that is provided at the other thereof and locks the third target connection tool when the accommodation body is accommodated in the accommodation space to prohibit a relative rotation about the center axis of the electromagnetic valve with respect to the hydraulic pressure circuit body.

According to still another aspect of the present invention, in the connecting structure of an electromagnetic valve, it is desirable that the first target connection tool is a protrusion portion that protrudes from one of the accommodation body and the wall portion constituting the accommodation space, and the first connection tool is a groove portion that guides the first target connection tool in response to an operation in which the accommodation body is accommodated into the accommodation space and locks the first target connection tool in the axis line direction after the rotation operation about the center axis in the accommodation body accommodating operation.

According to still another aspect of the present invention, in the connecting structure of an electromagnetic valve, it is desirable that the third target connection tool is a protrusion portion that protrudes from one of the connection body and the accommodation body, and the third connection tool is a locking portion that locks the third target connection tool while being pressed by the third target connection tool together with rotating operation of the accommodation body to stop the rotation operation.

According to still another aspect of the present invention, in the connecting structure of an electromagnetic valve, it is desirable that the hydraulic pressure circuit body is formed of a material having strength higher than that of the connection body.

According to still another aspect of the present invention, in the connecting structure of an electromagnetic valve, it is desirable that the connection body includes a through-hole that overlaps the accommodation space so that the accommodation body is inserted therethrough, and a holding portion that holds a conductive member electrically connecting the electromagnetic valve to a control unit controlling a driving of the electromagnetic valve, the conductive member includes a valve contact point that is exposed to the through-hole, and the electromagnetic valve includes a valve-side contact point that comes into contact with the valve contact point when the rotating operation of the accommodation body stops.

According to still another aspect of the present invention, in the connecting structure of an electromagnetic valve, it is desirable to further include that an erroneous assembly preventing mechanism that is provided between the electromagnetic valve and the hydraulic pressure circuit body or the connection body to prevent an erroneous assembly of the electromagnetic valve, wherein the erroneous assembly preventing mechanism includes a first engagement portion and a second engagement portion that are formed and arranged to engage with each other when the electromagnetic valve is assembled to a normal assembly position, the first engagement portion is provided at one of the electromagnetic valve and the hydraulic pressure circuit body or the connection body, and the second engagement portion is provided at the other of the electromagnetic valve and the hydraulic pressure circuit body or the connection body.

In order to achieve the above mentioned object, a hydraulic pressure control device according to still another aspect of the present invention includes: a hydraulic pressure circuit body that includes a hydraulic pressure circuit causing a working fluid of a control target to flow therethrough, and a columnar accommodation space communicating the hydraulic pressure circuit with an outside; a control unit that controls a flow rate of the working fluid in the hydraulic pressure circuit; an electromagnetic valve that is connected to the hydraulic pressure circuit body while a cylindrical or an annular accommodation body is inserted in an axis line direction of a center axis to be accommodated into the accommodation space and is controlled by the control unit to be driven so that the flow rate of the working fluid in the hydraulic pressure circuit is adjusted; a connection body that is prohibited from moving relatively to the hydraulic pressure circuit body; a first connecting structure body that prohibits a relative movement between the hydraulic pressure circuit body and the electromagnetic valve in the axis line direction when the accommodation body is accommodated in the accommodation space; a second connecting structure body that prohibits a relative movement between the hydraulic pressure circuit body and the electromagnetic valve in a plane orthogonal to the axis line direction when the accommodation body is accommodated in the accommodation space; and a third connecting structure body that prohibits a relative rotation about the center axis between the hydraulic pressure circuit body and the electromagnetic valve when the accommodation body is accommodated in the accommodation space, wherein the first connecting structure body includes a first target connection tool that is provided at one of the accommodation body and a wall portion constituting the accommodation space, and a first connection tool that is provided at the other thereof to lock the first target connection tool in the axis line direction when the accommodation body is accommodated in the accommodation space, the second connecting structure body includes a second target connection tool that is provided at one of the accommodation body and the wall portion constituting the accommodation space, and a second connection tool that is provided at the other thereof and prohibits a relative movement of the second target connection tool in a plane orthogonal to the axis line direction when the accommodation body is accommodated in the accommodation space, and the third connecting structure body includes a third target connection tool that is provided at one of the connection body and the accommodation body, and a third connection tool that is provided at the other thereof and locks the third target connection tool when the accommodation body is accommodated in the accommodation space to prohibit a relative rotation about the center axis of the electromagnetic valve with respect to the hydraulic pressure circuit body.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 26 is a front view illustrating a state of the first connecting structure body (the erroneous assembly preventing mechanism) when the electromagnetic valve is assembled to a position other than the normal assembly position.

DETAILED DESCRIPTION OF THE PREFERRED EMBODIMENTS

Hereinafter, an embodiment of a connecting structure of an electromagnetic valve and a hydraulic pressure control device according to the present invention will be described in detail with reference to the drawings. Further, the present invention is not limited to the embodiment.

Embodiment

An embodiment of a connecting structure of an electromagnetic valve and a hydraulic pressure control device according to the present invention will be described with reference to FIGS. 1 to 15.

A hydraulic pressure control device according to the embodiment is used to control an operation of a control target by adjusting a flow rate of a working fluid sent to the control target to change a hydraulic pressure of the working fluid. The hydraulic pressure control device includes a hydraulic pressure circuit body that causes a working fluid fed from a pump or the like to flow therethrough and at least one electromagnetic valve that adjusts a flow rate of the working fluid. The hydraulic pressure circuit body is provided with a hydraulic pressure circuit serving as a working fluid flow passage. The electromagnetic valve adjusts the flow rate of the working fluid in the hydraulic pressure circuit.

Here, the control target may be any control target which is operated by utilizing the hydraulic pressure of the working fluid. Then, the working fluid may be any working fluid which is used to operate the control target. In the embodiment, an automatic transmission which is mounted on a vehicle such as an automobile is exemplified as the control target. For this reason, an automatic transmission fluid (ATF) which is used to operate and lubricate the automatic transmission is used as the working fluid. Here, in the description below, a description will be made on the assumption that the control target is the automatic transmission. Further, in the description below, a description will be made on the assumption that the working fluid is the automatic transmission fluid and the hydraulic pressure is an oil pressure.

Figure 1:
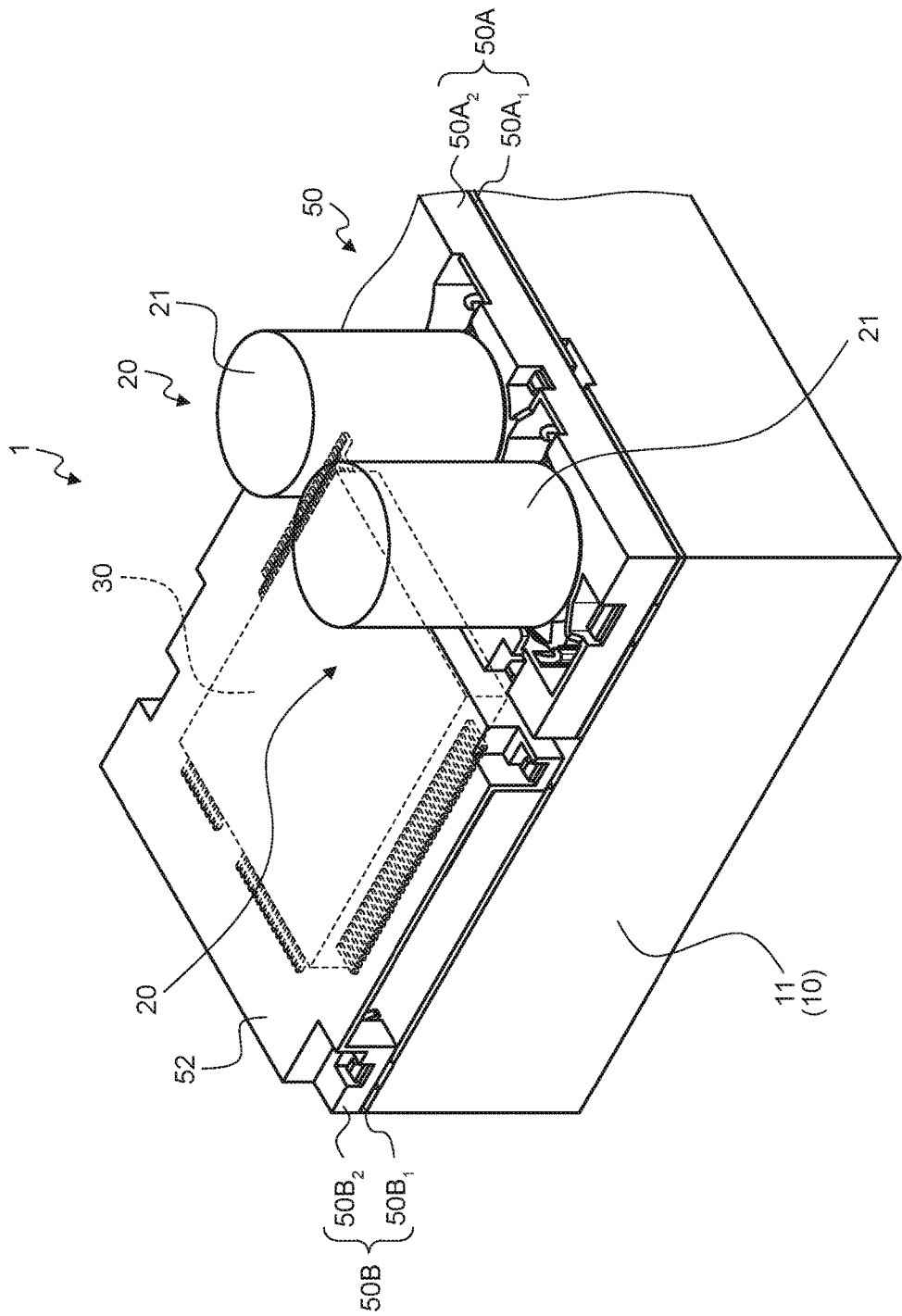
FIG. 1 is a perspective view illustrating an example of a hydraulic pressure control device including a connecting structure of an electromagnetic valve according to an embodiment.
Figure 2:
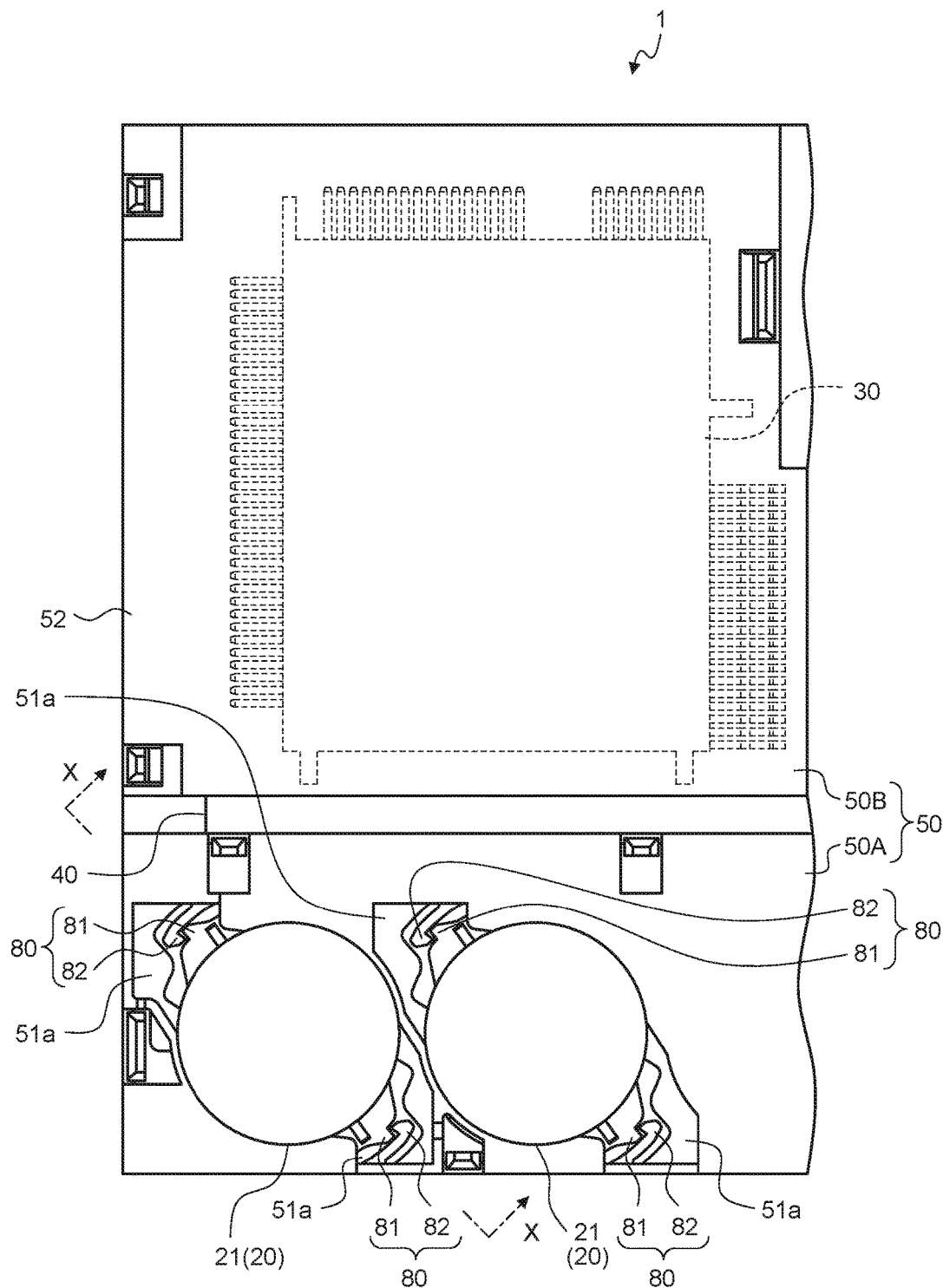
FIG. 2 is a front view illustrating an example of the hydraulic pressure control device including the connecting structure of the electromagnetic valve according to the embodiment.

Reference Numeral 1 of FIGS. 1 and 2 indicates an oil pressure control device (a hydraulic pressure control device) of the embodiment. The oil pressure control device 1 includes an oil pressure circuit body (a hydraulic pressure circuit body) 10, an electromagnetic valve 20, and a control unit 30. The oil pressure control device 1 of the drawing corresponds to a part of the oil pressure circuit body 10.

Figure 3:
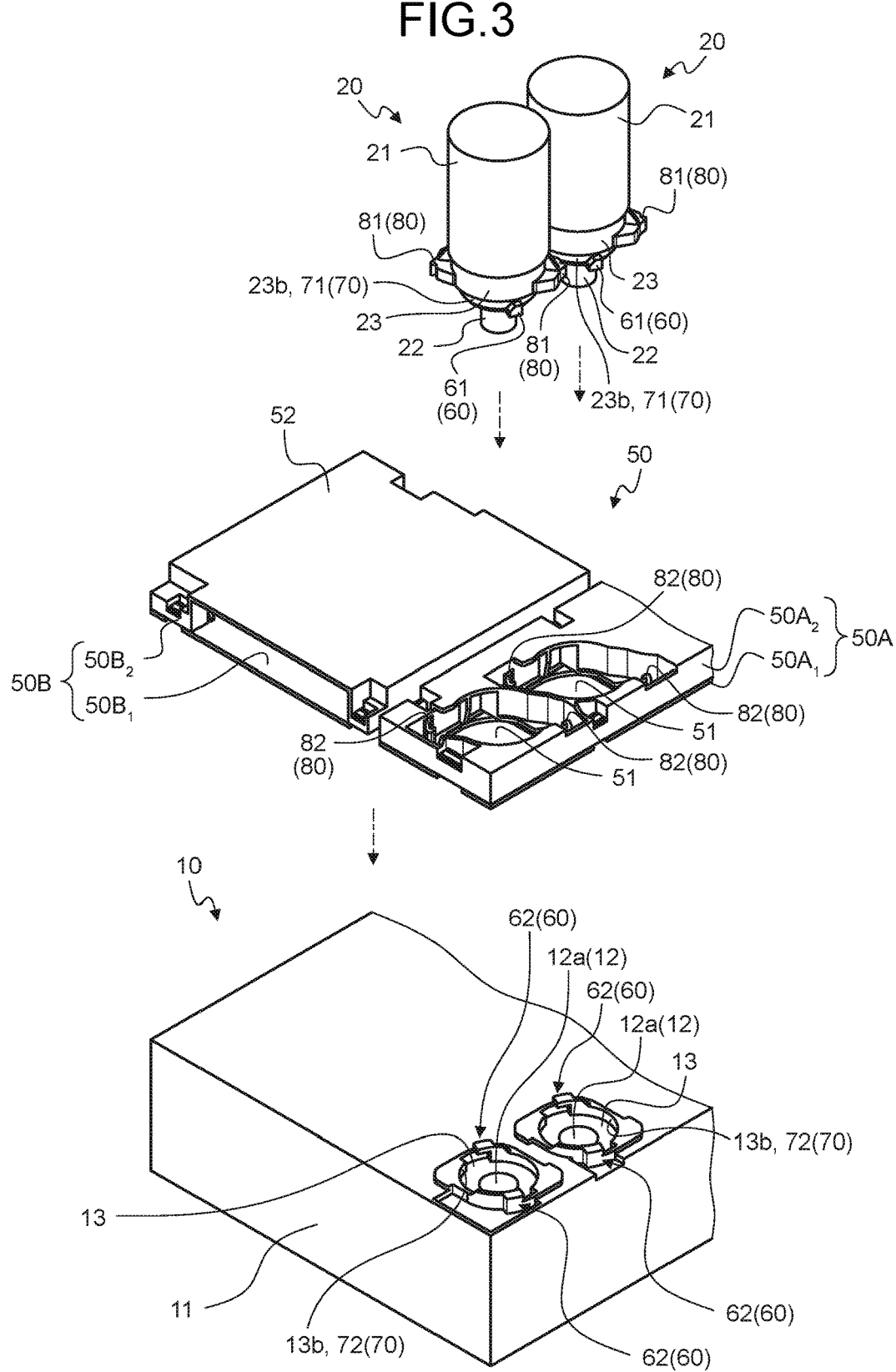
FIG. 3 is an exploded perspective view illustrating the hydraulic pressure control device of the embodiment.
Figure 4:
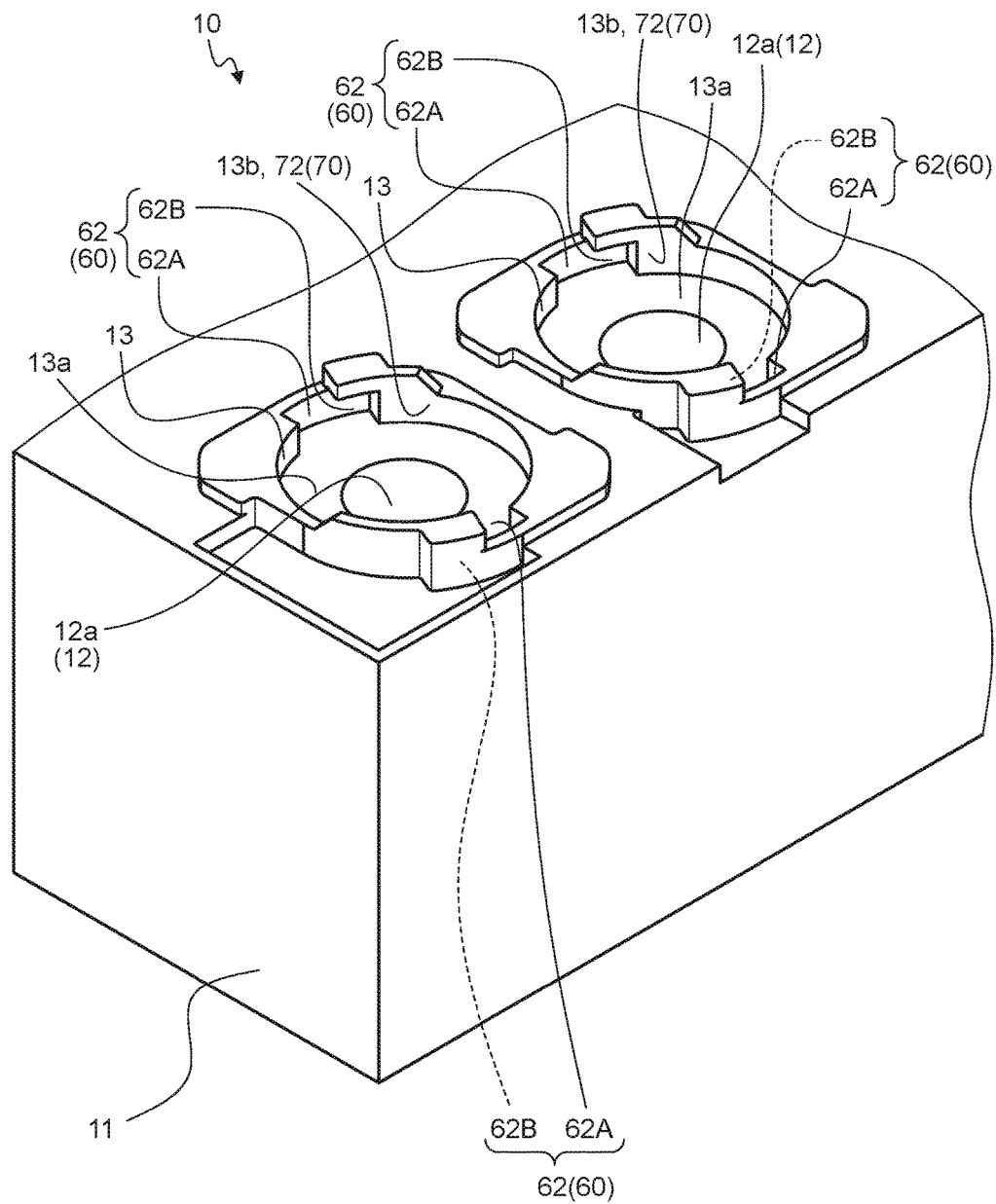
FIG. 4 is a perspective view illustrating a hydraulic pressure circuit body.
Figure 5:
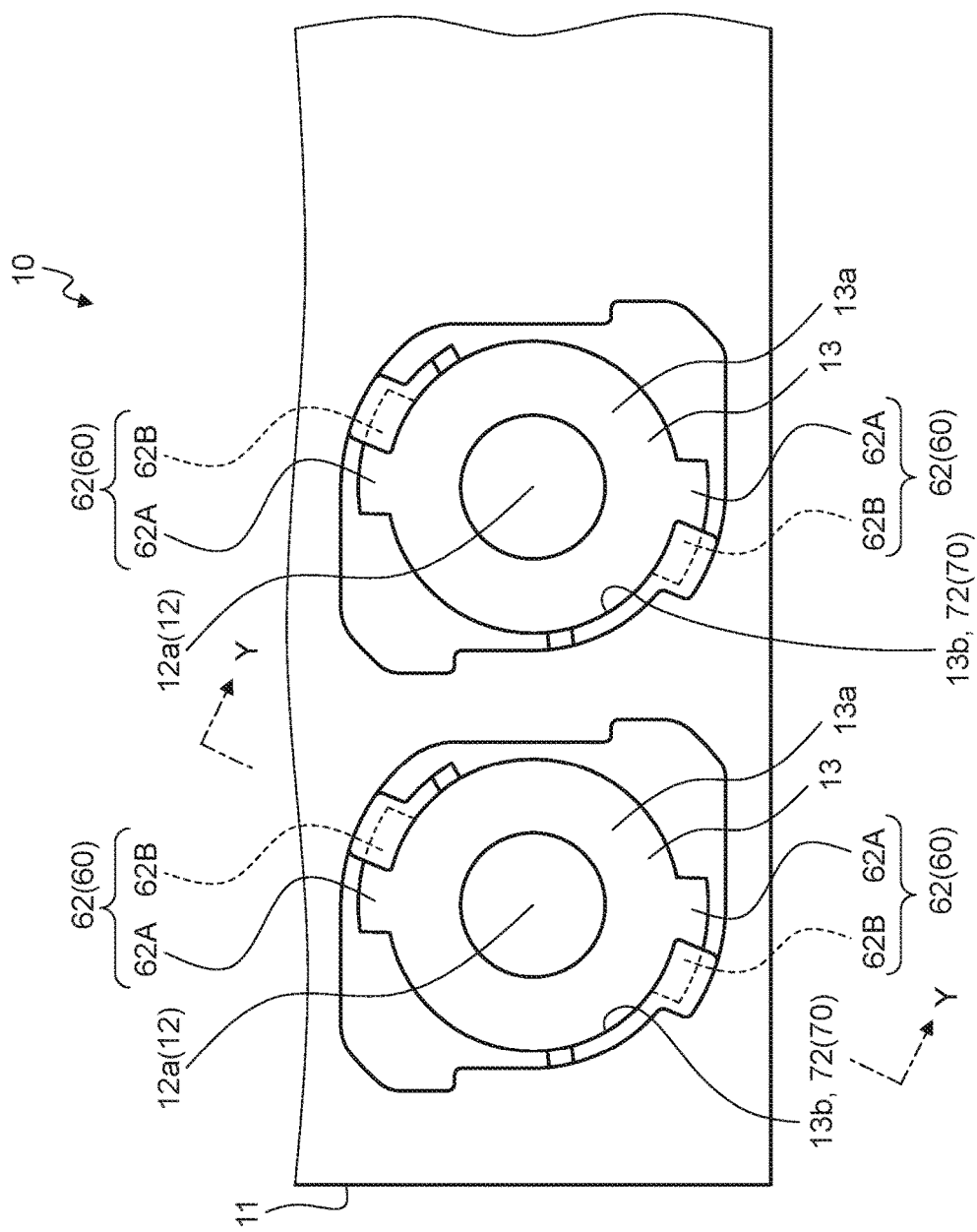
FIG. 5 is a front view illustrating the hydraulic pressure circuit body.

The oil pressure circuit body 10 is a so-called valve body. The oil pressure circuit body 10 has a configuration in which an oil pressure circuit (a hydraulic pressure circuit) 12 causing a working fluid for an automatic transmission (not illustrated) to flow therethrough is formed inside a main body 11 (FIGS. 3 to 5). The oil pressure circuit 12 includes a main passage (not illustrated) which forms a flow passage of the working fluid between a pump side of the automatic transmission and a control mechanism side (for example, a brake or a clutch), and a flow rate adjustment passage 12a which communicates with the main passage in the course of the main passage.

The main passage connects an inlet for the working fluid pressure-fed from the pump to an outlet for discharging the working fluid toward the control mechanism. The main passage is provided with various flow passages corresponding to gear shift stages of the automatic transmission. The flow rate adjustment passage 12a is a columnar passage through which a valve body 22 of the electromagnetic valve 20 to be described later moves in a reciprocating manner and is provided for each valve body 22. The valve body 22 adjusts the flow rate of the working fluid at the main passage in response to the position of the flow rate adjustment passage 12a.

The oil pressure circuit body 10 is provided with a columnar accommodation space 13 which communicates the oil pressure circuit 12 with the outside. The accommodation space 13 is disposed to be coaxial to the flow rate adjustment passage 12a and communicates with the flow rate adjustment passage 12a. The accommodation space 13 is a space which accommodates an accommodation body 23 of the electromagnetic valve 20 to be described later and is formed to have an outer diameter larger than that of the flow rate adjustment passage 12a. For this reason, the oil pressure circuit body 10 is provided with an annular bottom portion 13a of the accommodation space 13 (FIGS. 4 and 5). An annular front end face 23a (FIGS. 6 and 7) of the accommodation body 23 comes into contact with the bottom portion 13a when the accommodation body 23 is accommodated in the accommodation space 13.

Figure 6:
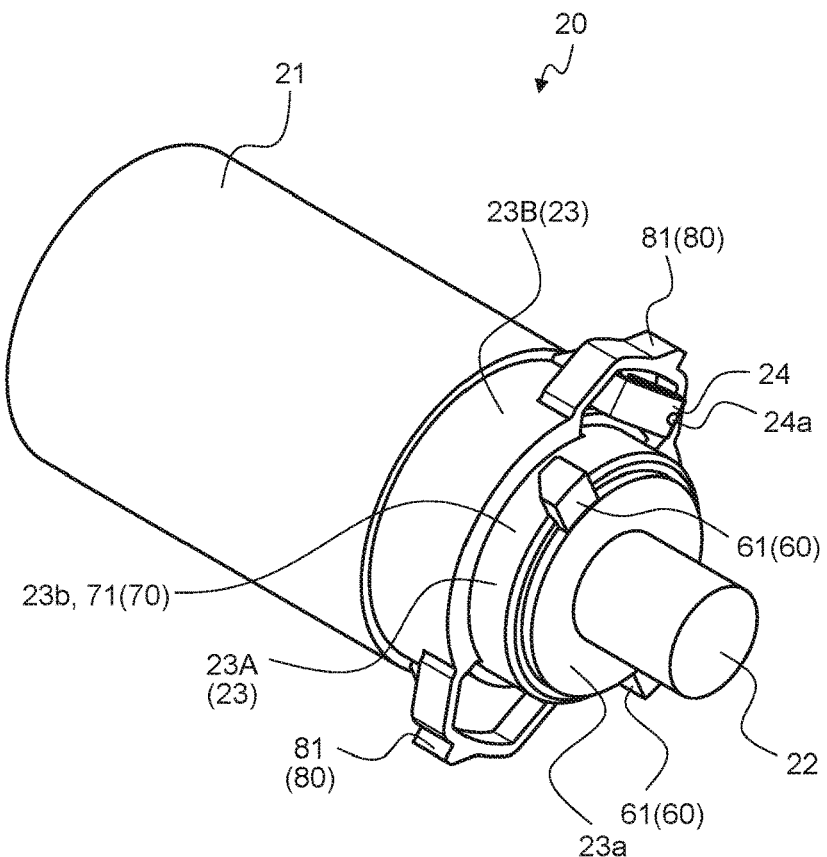
FIG. 6 is a perspective view illustrating an electromagnetic valve.
Figure 7:
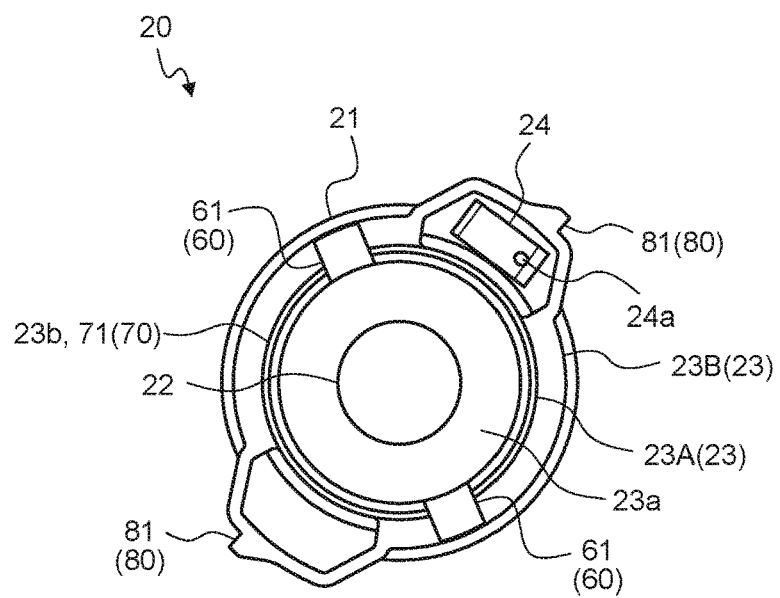
FIG. 7 is a diagram illustrating the electromagnetic valve when viewed from a valve body.

The electromagnetic valve 20 includes a main body 21 which accommodates a driving mechanism such as a coil or a return spring, and the valve body 22 which is moved in a reciprocating manner in the axis line direction by the driving mechanism (FIGS. 3, 6, and 7). The valve body 22 of the drawing is formed in a columnar shape for the convenience of description, but the shape is not particularly limited. For example, the valve body 22 is prepared in response to the shape of the oil pressure circuit 12 and may be a spool-shaped member (a so-called spool valve) in which columns having different outer diameters are concentrically combined with each other. The valve body 22 is disposed concentrically with respect to the flow rate adjustment passage 12a and moves in a reciprocating manner inside the flow rate adjustment passage 12a along the center axis thereof.

The electromagnetic valve 20 is provided with the cylindrical or annular accommodation body 23 which is disposed to be concentric with the valve body 22. The accommodation body 23 is inserted into the accommodation space 13 of the oil pressure circuit body 10 in the axis line direction of the center axis to be accommodated therein. The electromagnetic valve 20 is connected to the oil pressure circuit body 10 in the accommodation state. In the electromagnetic valve 20, the accommodation body 23 is connected to the main body 21, and the valve body 22 protrudes from the accommodation body 23 to be movable in a reciprocating manner. As the accommodation body 23 of this example, first and second accommodation bodies 23A and 23B having different outer diameters are concentrically provided (FIGS. 6 and 7). Further, the first accommodation body 23A includes two cylindrical or annular members having different outer diameters in the drawing. However, it is assumed that only one cylindrical or annular member is used for the convenience of description. The second accommodation body 23B has an outer diameter lager than that of the first accommodation body 23A and is disposed near the main body 21.

Further, the electromagnetic valve 20 is provided with a terminal 24 which is electrically connected to the driving mechanism. The terminal 24 is obtained by bending a plate-shaped base member formed of a conductive material such as metal in order to have a repulsive force and is deflected when a load is applied to a valve-side contact point 24a to be described later.

The control unit 30 is an electronic control unit (ECU) which is charge of a control operation of the oil pressure control device 1 and controls the flow rate of the working fluid in the oil pressure circuit 12 by controlling the driving of the electromagnetic valve 20. The control unit 30 transmits an instruction to the electromagnetic valve 20 corresponding to a control target in response to a target gear shift stage of the automatic transmission and controls the driving of the electromagnetic valve 20 so that the electromagnetic valve is opened or closed.

Figure 8:
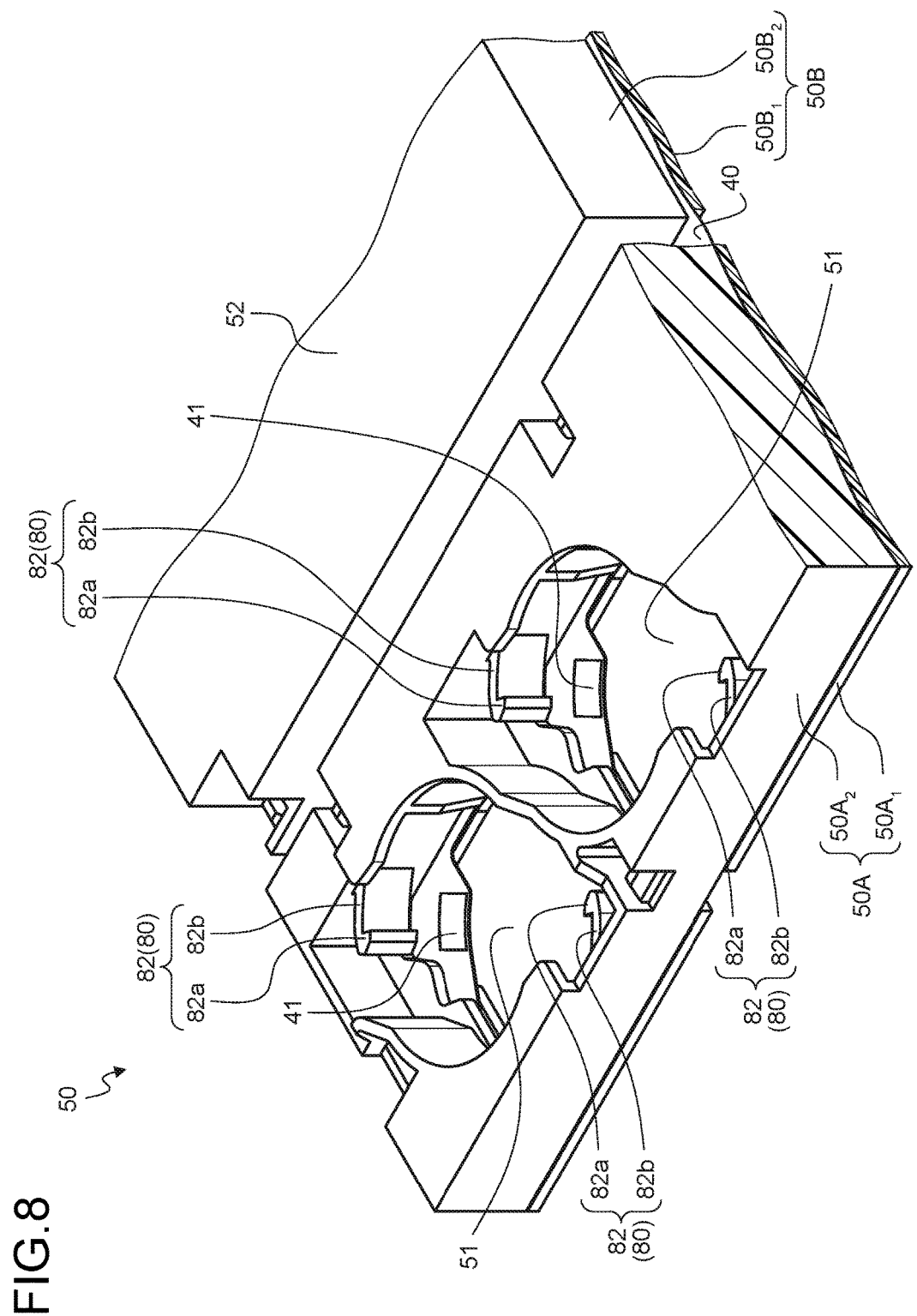
FIG. 8 is a perspective view illustrating a connection body.

The oil pressure control device 1 is provided with a conductive member 40 which electrically connects the electromagnetic valve 20 and the control unit 30 to each other (FIGS. 2 and 8). The conductive member 40 has a function of a terminal (hereinafter, referred to as a "valve terminal") electrically connected to the electromagnetic valve 20 and a function of a terminal (hereinafter, referred to as an "ECU terminal") electrically connected to the control unit 30. In the conductive member 40, a combination of the valve terminal and the ECU terminal is provided for each electromagnetic valve 20. The valve terminal and the ECU terminal are electrically connected to each other in each combination. For example, the conductive member 40 is formed as a flexible printed circuit (FPC) in which a thin film of a conductive material is formed on an insulation film or a plate-shaped busbar which is formed of a conductive material such as metal. Here, the conductive member 40 is exemplified as the flexible printed circuit. The conductive member 40 is provided with a valve terminal contact point (hereinafter, referred to as a "valve contact point") 41 (FIGS. 8 and 9) electrically connected to the electromagnetic valve 20 and an ECU terminal contact point (an ECU contact point) electrically connected to the control unit 30 although not illustrated in the drawings. Further, the electromagnetic valve 20 is provided with the contact point (hereinafter, referred to as a "valve-side contact point") 24a which comes into contact with the valve contact point 41 so that the driving mechanism of the electromagnetic valve 20 is electrically connected to the valve contact point 41 (FIGS. 6 and 7). The valve-side contact point 24a is formed to protrude from the terminal 24 of the electromagnetic valve 20.

The oil pressure control device 1 is provided with a connecting structure which keeps a predetermined connection state of the electromagnetic valve 20 with respect to the oil pressure circuit body 10 according to a design. The oil pressure control device 1 is provided with a connection body 50 which serves as a part of the connecting structure and is connected to the accommodation body 23 of the electromagnetic valve 20 (FIGS. 1 to 3). The connection body 50 is disposed so as not to move relatively to the oil pressure circuit body 10. For example, the connection body 50 is fixed to the oil pressure circuit body 10 through a fixing tool (not illustrated) such as a bolt. The connection body 50 is nipped between the electromagnetic valve 20 and the oil pressure circuit body 10 and is connected to the accommodation body 23 when the accommodation body 23 of the electromagnetic valve 20 is accommodated in the accommodation space 13 of the oil pressure circuit body 10. Without such a fixing tool, the connection body 50 may be configured to be prohibited from moving relatively to the oil pressure circuit body 10 while being nipped between the oil pressure circuit body 10 and the electromagnetic valve 20 when the electromagnetic valve 20 is completely connected to the oil pressure circuit body 10.

The connection body 50 is attached to the outer wall side of the oil pressure circuit body 10 and includes a through-hole 51 which overlaps the accommodation space 13 so that the accommodation body 23 is inserted therethrough (FIG. 3). The accommodation body 23 of the electromagnetic valve 20 is inserted into the accommodation space 13 through the through-hole 51. As will be described later, the accommodation body 23 of this example is provided with a first target connection tool 61 and a third target connection tool 81 which protrude outward in the radial direction. For this reason, the through-hole 51 is formed in a shape avoiding the first target connection tool 61 and the third target connection tool 81 so that the first target connection tool 61 and the third target connection tool 81 are not caught by the accommodation body 23 when the accommodation body is inserted therethrough. For example, in order to determine the shape in this example, the through-hole 51 is provided with a insertion portion 51a through which the third target connection tool 81 can be inserted in accordance with the shape of the third target connection tool 81 protruding outward to maximum (FIG. 2). The shape of the insertion portion 51a is similar to, for example, the shape of the third target connection tool 81 when viewed from the insertion direction. However, if the insertion portion is formed to be larger than the projection area of the third target connection tool 81 when viewed from the insertion direction, the insertion portion can be also used as a guide portion that guides the insertion of the accommodation body 23.

Incidentally, the connection body 50 may be provided as a component that just physically connects the electromagnetic valve 20 and the oil pressure circuit body 10 to each other or may have the other functions. In the former case, the connection body 50 may be individually provided for each electromagnetic valve 20 or may include a plurality of the through-holes 51 respectively corresponding to a plurality of the electromagnetic valves 20. Then, the connection body 50 in this case may be integrally molded with the oil pressure circuit body 10. Meanwhile, in the latter case, the connection body 50 may has an electrical connection function between the electromagnetic valve 20 and the control unit 30 other than a physical connection function between the electromagnetic valve 20 and the oil pressure circuit body 10, for example, in such a manner that a main body portion including a plurality of through-holes 51 respectively corresponding to a plurality of the electromagnetic valves 20 is molded and the conductive member 40 is held by the main body portion. The connection body 50 of the embodiment corresponds to the latter example.

Figure 9:
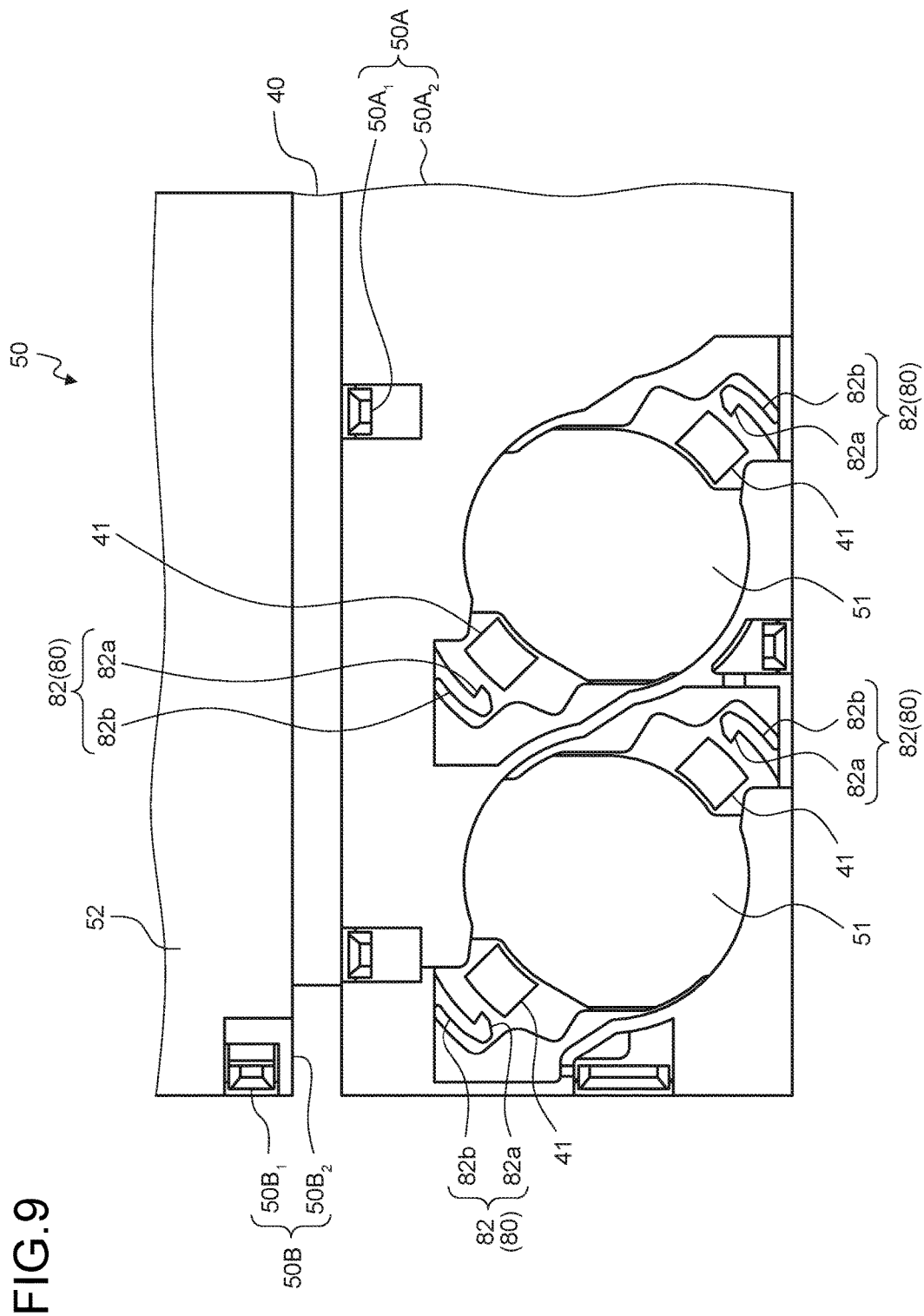
FIG. 9 is a front view illustrating the connection body.

The connection body 50 of the embodiment includes a first connection body 50A and a second connection body 50B (FIGS. 1 to 3) and the first connection body 50A corresponding to a main body portion has a function of connecting the electromagnetic valve 20 and the oil pressure circuit body 10 to each other. Furthermore, the conductive member 40 is held by the first connection body 50A and the second connection body 50B of the connection body 50. For this reason, the first connection body 50A and the second connection body 50B are molded from an insulation material such as a synthetic resin material. The first connection body 50A is provided with a holding portion (hereinafter, referred to as a "first holding portion") which holds the valve contact point 41 of the conductive member 40. The second connection body 50B is provided with a holding portion (herein-after, referred to as a "second holding portion") which holds the ECU contact point of the conductive member 40. The first connection body 50A is obtained by integrating a plate-shaped base portion $50A_1$ and a plate-shaped main portion $50A_2$ in an overlapping state and the valve contact point 41 of the conductive member 40 is nipped between the base portion $50A_1$ and the main portion $50A_2$. In the first connection body 50A, the through-hole 51 is formed by the through-holes of the base portion $50A_1$ and the main portion $50A_2$ and the valve contact point 41 is exposed to the through-hole 51 (FIGS. 8 and 9). The second connection body 50B is obtained by integrating a plate-shaped base portion $50B_1$ and a plate-shaped main portion $50B_2$ in an overlapping state and the ECU contact point of the conductive member 40 is nipped between the base portion $50B_1$ and the main portion $50B_2$.

Figure 10:
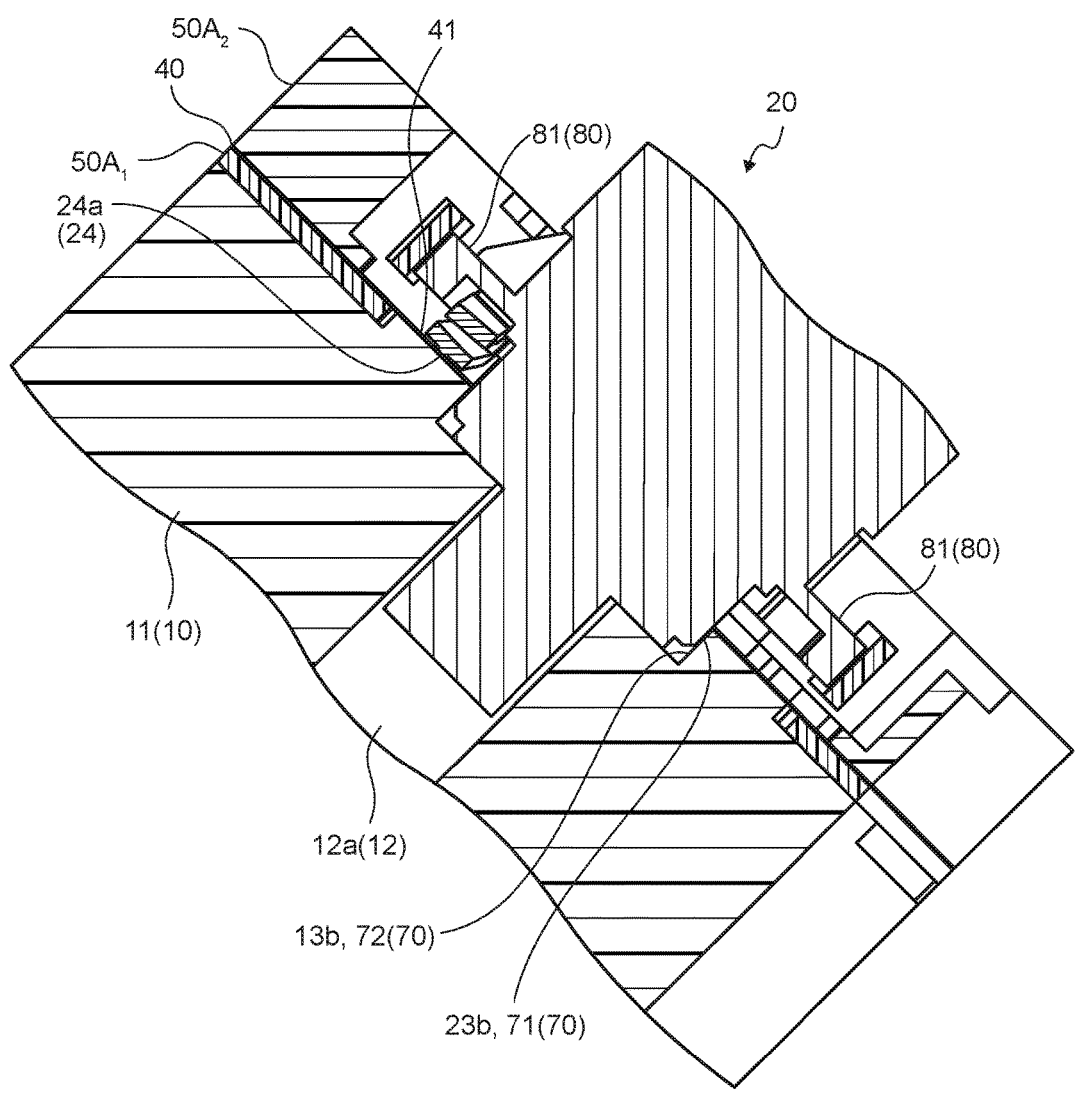
FIG. 10 is a cross-sectional view taken along a line X-X of FIG. 2.

Here, in the oil pressure control device 1, the valve contact point 41 of the conductive member 40 is nipped between the oil pressure circuit body 10 and the valve-side contact point 24a of the electromagnetic valve 20 after the connection between the oil pressure circuit body 10 and the electromagnetic valve 20 is completed (FIG. 10). Then, the valve-side contact point 24a and the valve contact point 41 are disposed to come into contact with each other when the rotation operation of the electromagnetic valve 20 stops (that is, the valve-side contact point and the valve contact point are electrically connected to each other when the electromagnetic valve 20 is completely connected to the oil pressure circuit body 10). Accordingly, there is no need to perform a separate electrical connection operation between the electromagnetic valve 20 and the conductive member 40 of the oil pressure control device 1. Further, in the oil pressure control device 1, the valve-side contact point 24a slides along the valve contact point 41 together with the rotation operation so that a contact portion between the valve-side contact point 24a and the valve contact point 41 is wiped. Accordingly, an oxide coating formed on the contact portion can be removed. Then, in the oil pressure control device 1, the contact portion is disposed at the opposite side to the flow rate adjustment passage 12a. For this reason, it is possible to suppress a removed oxide coating from intruding into the flow rate adjustment passage 12a and to suppress a contamination inside the working fluid. Further, in the drawing, for the convenience of description, the inner shapes of the oil pressure circuit body 10 and the electromagnetic valve 20 are omitted.

In this way, a member obtained by integrating the conductive member 40 and the connection body 50 in the oil pressure control device 1 serves as a connector module that electrically connects the electromagnetic valve 20 and the control unit 30 to each other. Here, the main portion $50B_2$ of the second connection body 50B of this example is provided with an ECU holding portion 52 which holds the control unit 30 (FIGS. 1 and 2). For this reason, in the oil pressure control device 1, the control unit 30 and the conductive member 40 may be connected to the connection body 50 to be integrated therewith. Accordingly, the integrated member may be used as a module.

The connecting structure of the electromagnetic valve 20 includes a first connecting structure body 60, a second connecting structure body 70, and a third connecting structure body 80 using the connection body 50 (FIG. 3). Each of the first to third connecting structure bodies 60, 70, and 80 may be provided at one position. In the embodiment, as will be described later, each of the first connecting structure body 60 and the third connecting structure body 80 is provided at two positions and the second connecting structure body 70 is provided at one position.

The first connecting structure body 60 is used to prohibit the relative movement between the oil pressure circuit body 10 and the electromagnetic valve 20 in the axis line direction when the accommodation body 23 of the electromagnetic valve 20 is accommodated in the accommodation space 13 of the oil pressure circuit body 10.

The first connecting structure body 60 includes the first target connection tool 61 (FIGS. 6 and 7) which is provided at one of the accommodation body 23 and a wall portion (an inner peripheral wall portion 13b) constituting the accommodation space 13 and a first connection tool 62 (FIGS. 4 and 5) which is provided at the other thereof and locks the first target connection tool 61 in the axis line direction (the axis line direction of the accommodation space 13 or the accommodation body 23) when the accommodation body 23 is accommodated in the accommodation space 13.

Specifically, the first target connection tool 61 is a protrusion portion that protrudes from one of the accommodation body 23 and the wall portion constituting the accommodation space 13. When the first target connection tool 61 is provided at the accommodation space 13, the first target connection tool 61 partially protrudes inward in the radial direction from, for example, the wall portion (the inner peripheral wall portion 13b) of the accommodation space 13. On the contrary, when the first target connection tool 61 is provided at the accommodation body 23, the first target connection tool 61 partially protrudes outward in the radial direction from, for example, the outer peripheral wall portion of the accommodation body 23.

Here, in a case where the electromagnetic valve 20 is attached to the oil pressure circuit body 10, the accommodation body 23 is inserted into the accommodation space 13 in the axis line direction of the center axis (the center axis of the accommodation body 23). After the front end face 23a of the accommodation body 23 comes into contact with the bottom portion 13a of the accommodation space 13, the entire accommodation body is rotated about the center axis. For this reason, the first connection tool 62 is formed as a groove portion that guides the first target connection tool 61 in response to an operation in which the accommodation body 23 is accommodated into the accommodation space 13 and locks the first target connection tool 61 in the axis line direction (the axis line direction of the accommodation space 13 or the accommodation body 23) after the rotation operation about the center axis (the center axis of the accommodation body 23) in the accommodation operation of the accommodation body 23. In a case where the first connection tool 62 is provided at the accommodation space 13, for example, a part of the wall portion (the inner peripheral wall portion 13b) of the accommodation space 13 is formed in a groove shape that is recessed outward in the radial direction. On the contrary, in a case where the first connection tool 62 is provided at the accommodation body 23, the first connection tool 62 is formed in, for example, a groove shape in which a part of the outer peripheral wall portion of the accommodation body 23 is recessed inward in the radial direction.

Figure 11:
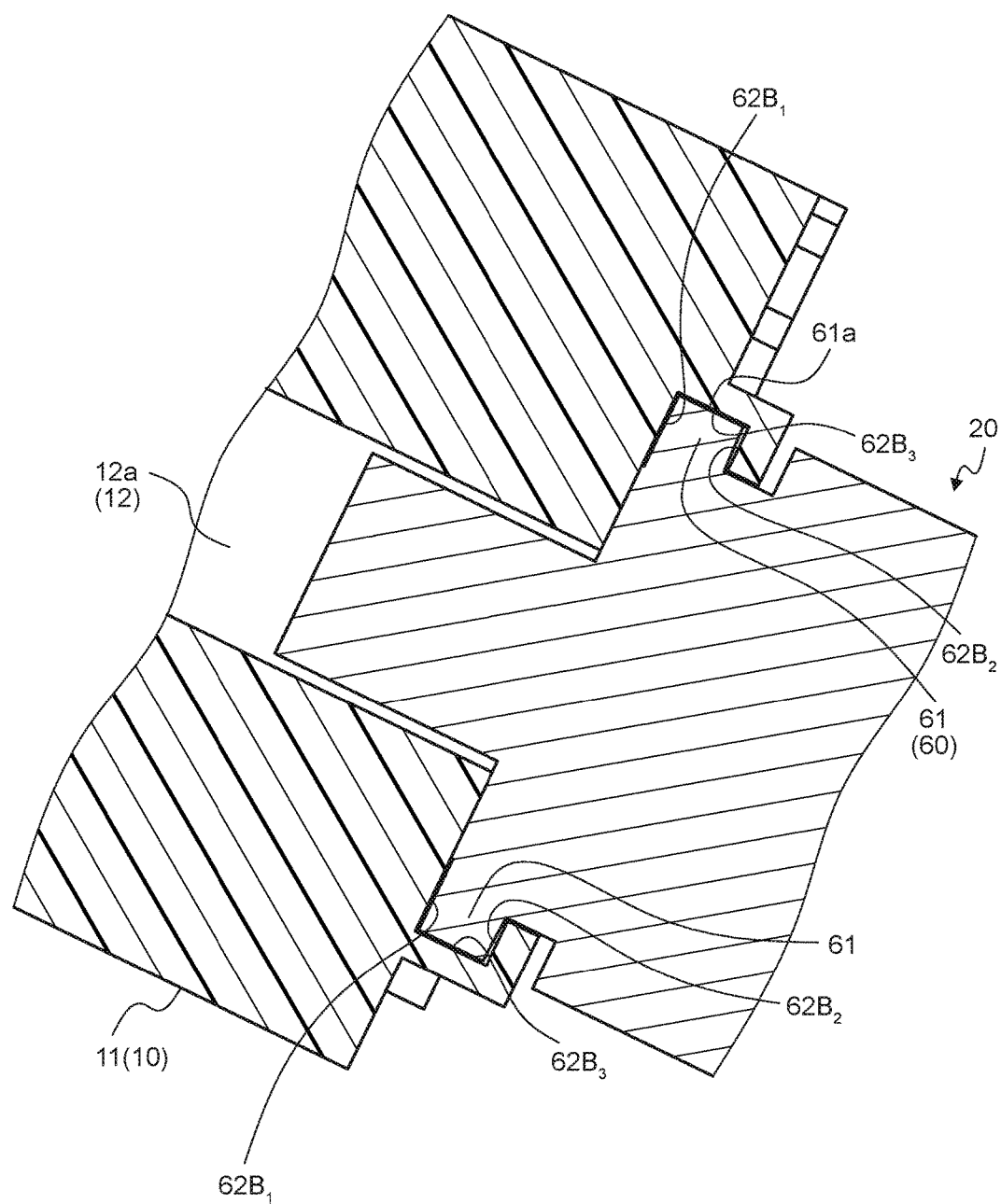
FIG. 11 is a cross-sectional view taken along a line Y-Y of FIG. 5.
Figure 12:
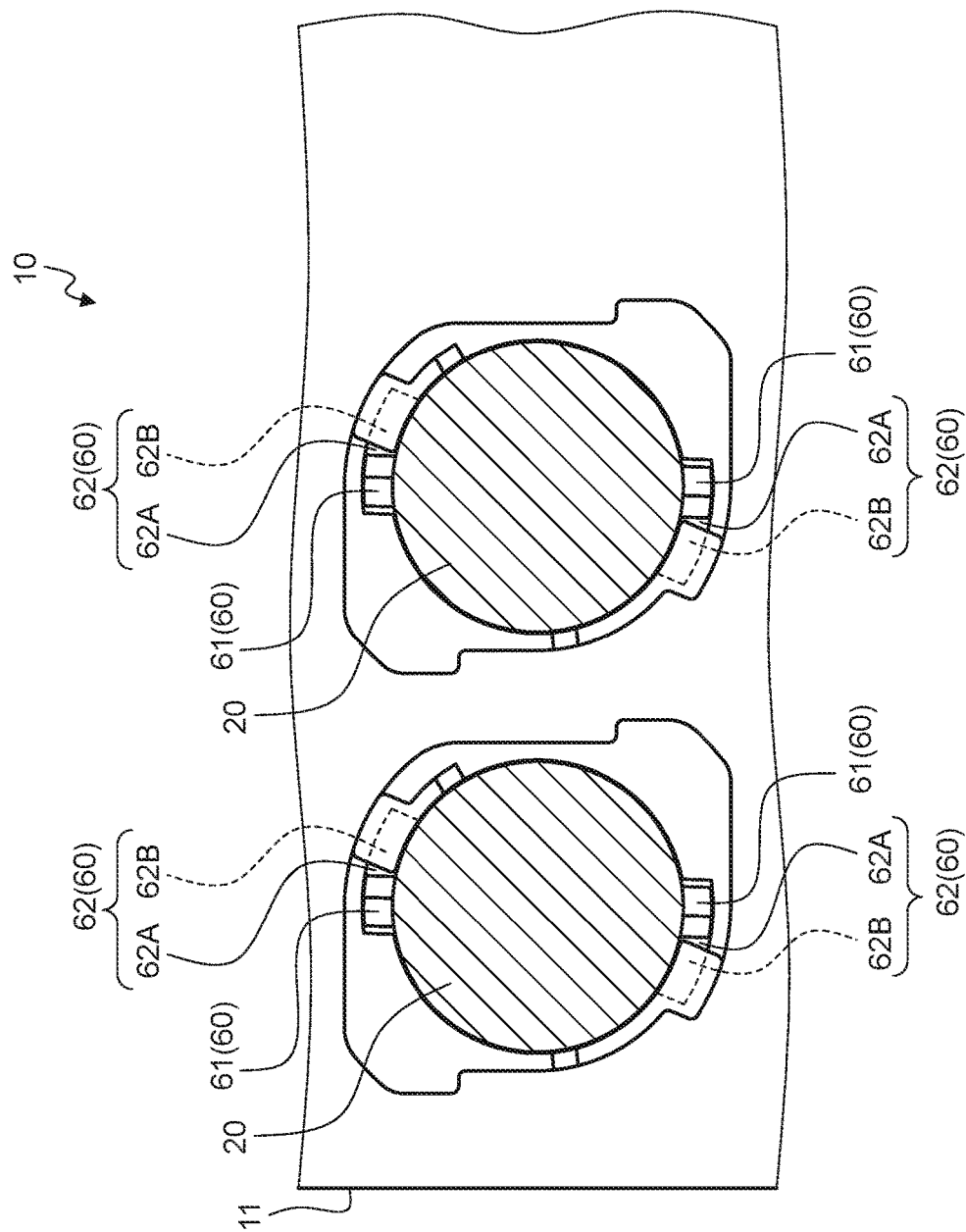
FIG. 12 is a front view illustrating a state of a first connecting structure body in a state where the electromagnetic valve is completely inserted in the axis line direction.
Figure 13:
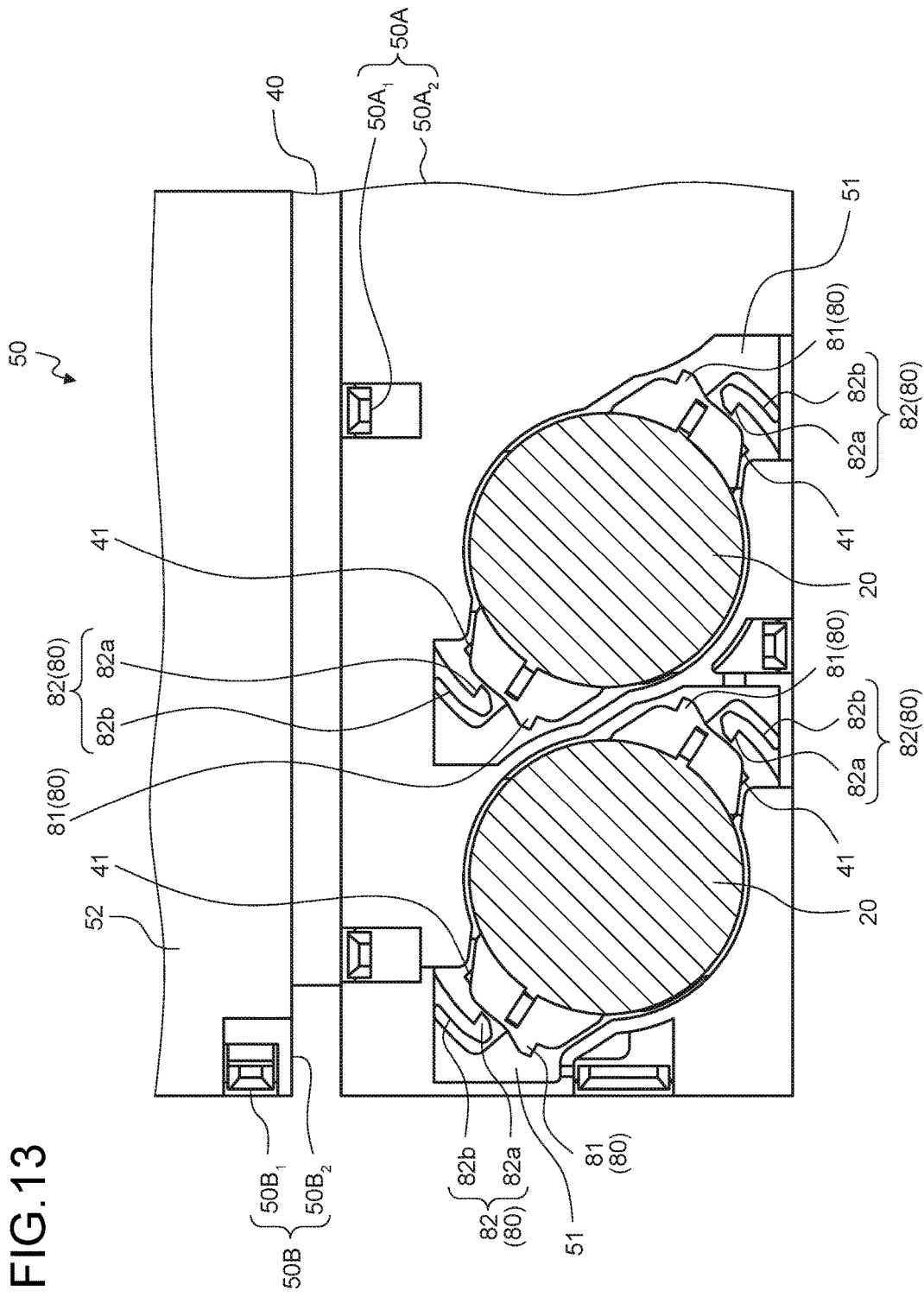
FIG. 13 is a front view illustrating a state of a second connecting structure body in a state where the electromagnetic valve is completely inserted in the axis line direction.
Figure 14:
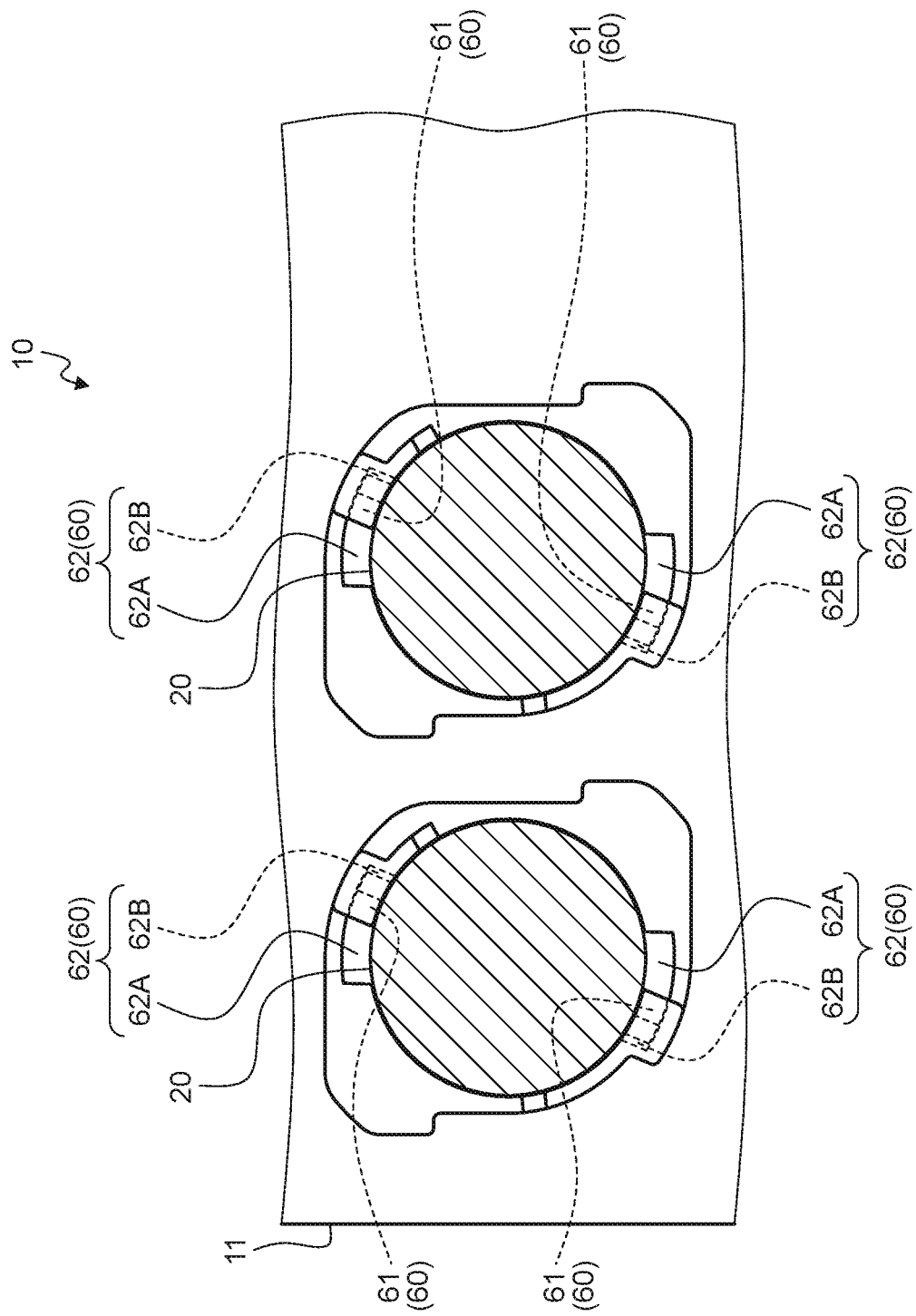
FIG. 14 is a front view illustrating a state of the first connecting structure body after the electromagnetic valve is completely connected.
Figure 15:
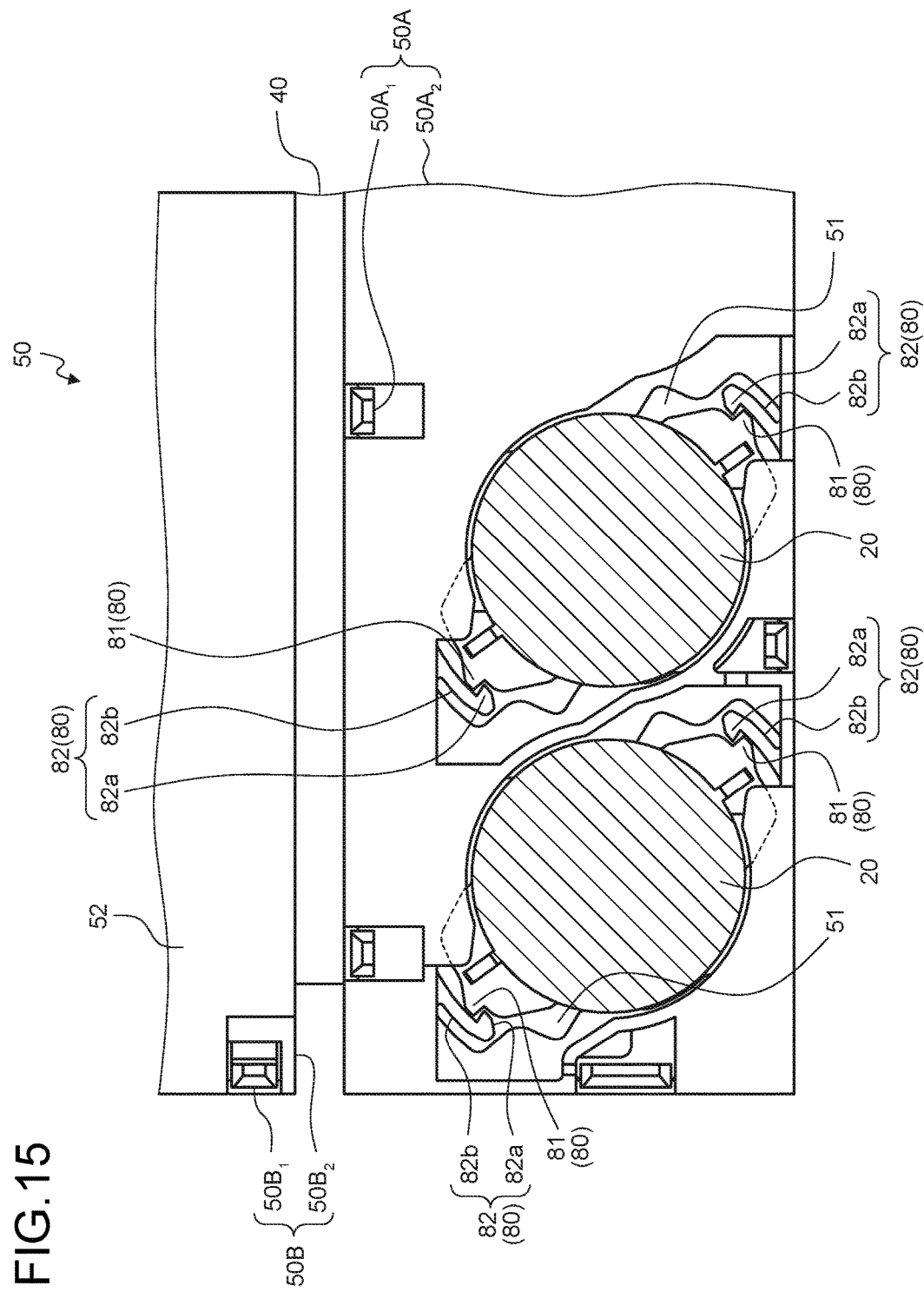
FIG. 15 is a front view illustrating a state of the second connecting structure body after the electromagnetic valve is completely connected.

Specifically, the first connection tool 62 includes an axis-line-direction groove portion 62A. The axis-line-direction groove portion 62A is a groove that guides the first target connection tool 61 when the accommodation body 23 is inserted into the accommodation space 13 in the axis line direction. The axis-line-direction groove portion 62A extends in the axis line direction from the outer wall face of the oil pressure circuit body 10 to the bottom portion 13a of the accommodation space 13. For example, the axis-line-direction groove portion 62A has a shape similar to the shape of the first target connection tool 61 when viewed from the insertion direction. However, when the axis-line-direction groove portion 62A is formed to have a circumferential projection area larger than that of the first target connection tool 61 when viewed from the insertion direction, the axis-line-direction groove portion 62A also serves as a guide portion that guides the insertion of the accommodation body 23 with respect to the accommodation space 13. Further, the first connection tool 62 includes a circumferential groove portion 62B. The circumferential groove portion 62B is a groove that guides the first target connection tool 61 when the accommodation body 23 is rotated about the center axis inside the accommodation space 13. The circumferential groove portion 62B extends in the circumferential direction from the bottom portion 13a of the axis-line-direction groove portion 62A. The circumferential groove portion 62B includes a first side wall $62B_1$ which is flush with the bottom portion 13a and a second side wall $62B_2$ which faces the first side wall $62B_1$ in the axis line direction (FIG. 11). Further, in the drawing, for the convenience of description, the inner shapes of the oil pressure circuit body 10 and the electromagnetic valve 20 are omitted.

It is desirable that a gap between the first side wall $62B_1$ and the second side wall $62B_2$ be substantially equal to the length of the first target connection tool 61 in the axis line direction within a range in which the rotation operation of the electromagnetic valve 20 is not disturbed. Accordingly, the movement of the first target connection tool 61 in the axis line direction is regulated by the first side wall $62B_1$ and the second side wall $62B_2$. In the oil pressure control device 1, since the first connecting structure body 60 is provided in at least one position, the relative movement between the oil pressure circuit body 10 and the electromagnetic valve 20 in the axis line direction can be prohibited. Further, when the first connecting structure body 60 is provided in at least two positions, the relative movement prohibiting effect can be further improved. For example, in this example, the first connecting structure body 60 is provided at two positions at the substantially same interval about the axis line (about the center axis). Thus, in the oil pressure control device 1, the movement between the oil pressure circuit body 10 and the electromagnetic valve 20 in the axis line direction is uniformly regulated. Accordingly, the relative movement between the oil pressure circuit body 10 and the electromagnetic valve 20 in the axis line direction can be further appropriately prohibited.

Next, the second connecting structure body 70 is used to prohibit the relative movement between the oil pressure circuit body 10 and the electromagnetic valve 20 in a plane orthogonal to the axis line direction when the accommodation body 23 of the electromagnetic valve 20 is accommodated in the accommodation space 13 of the oil pressure circuit body 10. The relative movement to be prohibited indicates the relative movement in a direction orthogonal to the axis line direction.

The second connecting structure body 70 includes a second target connection tool 71 (FIGS. 3, 6, and 7) which is provided at one of the accommodation body 23 and the wall portion (the inner peripheral wall portion 13b) constituting the accommodation space 13 and a second connection tool 72 (FIGS. 3 to 5) which is provided at the other thereof and prohibits the relative movement of the second target connection tool 71 in a plane orthogonal to the axis line direction (the axis line direction of the accommodation space 13 or the accommodation body 23) when the accommodation body 23 is accommodated in the accommodation space 13.

For example, in this example, an outer peripheral wall portion 23b of the first accommodation body 23A is used as the second target connection tool 71 and the inner peripheral wall portion 13b of the accommodation space 13 is used as the second connection tool 72. In the second connecting structure body 70 in this case, the relative movement between the accommodation body 23 and the accommodation space 13 in a direction orthogonal to the axis line direction is prohibited in such a manner that the outer peripheral wall portion 23b (the second target connection tool 71) and the inner peripheral wall portion 13b (the second connection tool 72) are formed to have the same outer diameter and are fitted to each other while the rattling thereof is suppressed. Accordingly, the second connecting structure body 70 can prohibit the relative movement between the oil pressure circuit body 10 and the electromagnetic valve 20 in a direction orthogonal to the axis line direction.

Here, since the first connecting structure body 60 is disposed at a plurality of positions about the axis line (about the center axis) at the same interval in the oil pressure control device 1, the first target connection tool 61 may be configured to have the function of the second target connection tool 71 and the first connection tool 62 may have the function of the second connection tool 72. In this case, at least two pairs of the first target connection tool 61 and the first connection tool 62 are disposed to face each other in the radial direction (the radial direction of the accommodation space 13 or the accommodation body 23) and the first target connection tool 61 and the first connection tool 62 are formed to be fitted to each other while the rattling thereof is suppressed. Accordingly, the relative movement between the accommodation body 23 and the accommodation space 13 in a direction orthogonal to the axis line direction is prohibited.

In order to realize such a configuration, the first target connection tool 61 and the first connection tool 62 are formed to be fitted to each other, for example, while the rattling thereof in the axis line direction is suppressed. For example, as described above, a gap between the first side wall $62B_1$ and the second side wall $62B_2$ is formed to be substantially equal to the length of the first target connection tool 61 in the axis line direction within a range in which the rotation operation of the electromagnetic valve 20 is not disturbed. Then, two pairs facing each other in the radial direction are formed to be fitted to each other while the rattling thereof in the radial direction between the accommodation body 23 and the accommodation space 13 is suppressed by the first target connection tool 61 and the first connection tool 62 of both combinations. For example, two pairs of the first target connection tool 61 and the first connection tool 62 are formed to come into contact with each other within a range in which the insertion operation and the rotation operation of the accommodation body 23 are not disturbed at a position where an outer radial wall portion 61a of the first target connection tool 61 and an outer radial wall portion (a bottom wall) $62B_3$ of the circumferential groove portion 62B are completely connected to each other (FIG. 11). That is, in this case, the accommodation space 13 and the accommodation body 23 can be fitted to each other in the radial direction by two pairs of the wall portion 61a of the first target connection tool 61 and the bottom wall $62B_3$ of the circumferential groove portion 62B. Accordingly, the relative movement between the oil pressure circuit body 10 and the electromagnetic valve 20 in a direction orthogonal to the axis line direction can be prohibited.

Next, the third connecting structure body 80 is used to prohibit the relative rotation between the oil pressure circuit body 10 and the electromagnetic valve 20 about the center axis (the center axis of the accommodation space 13 or the accommodation body 23) when the accommodation body 23 of the electromagnetic valve 20 is accommodated in the accommodation space 13 of the oil pressure circuit body 10.

The third connecting structure body 80 includes a third target connection tool 81 (FIGS. 6 and 7) which is provided at one of the connection body 50 and the accommodation body 23 and a third connection tool 82 (FIGS. 8 and 9) which is provided at the other thereof and locks the third target connection tool 81 when the accommodation body 23 is accommodated in the accommodation space 13 to prohibit the relative rotation of the electromagnetic valve 20 about the center axis with respect to the oil pressure circuit body 10.

Specifically, the third target connection tool 81 is a protrusion portion that protrudes from one of the connection body 50 and the accommodation body 23. When the third target connection tool 81 is provided at the connection body 50, the third target connection tool 81 protrudes inward in the radial direction from, for example, the wall portion (the inner wall portion) constituting the through-hole 51 of the connection body 50. On the contrary, when the third target connection tool 81 is provided at the accommodation body 23, the third target connection tool 81 protrudes outward in the radial direction from, for example, the outer peripheral wall portion of the accommodation body 23.

Meanwhile, the third connection tool 82 is a locking portion which locks the third target connection tool 81 while being pressed by the third target connection tool 81 together with the above-described rotation operation of the accommodation body 23 to stop the rotation operation. When the third connection tool 82 is provided at the connection body 50, the third connection tool 82 protrudes inward in the radial direction from, for example, the wall portion (the inner wall portion) of the through-hole 51. On the contrary, when the third connection tool 82 is provided at the accommodation body 23, the third connection tool 82 protrudes outward in the radial direction from, for example, the outer peripheral wall portion of the accommodation body 23. Specifically, the third connection tool 82 includes a claw portion 82a over which the third target connection tool 81 gets while moving in a pressed state together with the rotation operation of the accommodation body 23 and a connection portion 82b that connects the claw portion 82a to any one of the connection body 50 and the accommodation body 23. It is desirable that the connection portion 82b have flexibility so that a pressing force is applied to the third target connection tool 81 when the third target connection tool 81 gets over the claw portion 82a while pressing the claw portion.

Since the third connecting structure body 80 is provided in at least one position of the oil pressure control device 1, the rotation operation in a direction opposite to the rotation operation of the accommodation body 23 with respect to the connection body 50 (the rotation operation when the electromagnetic valve 20 is attached to the oil pressure circuit body 10) is regulated. Then, in the oil pressure control device 1, the connection body 50 is fixed to the oil pressure circuit body 10 as described above. Thus, in the oil pressure control device 1, the relative rotation about the axis between the oil pressure circuit body 10 and the electromagnetic valve 20 can be prohibited. Here, when the third connecting structure body 80 is provided in at least two positions, the relative rotation prohibiting effect can be improved. For example, in this example, the third connecting structure body 80 is provided at two positions about the axis at the same interval. Thus, in the oil pressure control device 1, the relative rotation about the axis between the oil pressure circuit body 10 and the electromagnetic valve 20 can be prohibited.

Here, in each of the third connecting structure bodies 80, the third target connection tool 81 and the third connection tool 82 may be formed so that a pressing force is applied between the third target connection tool 81 and the third connection tool 82 in the radial direction. Accordingly, the third connecting structure body 80 can regulate the relative movement between the accommodation body 23 and the connection body 50 in the axis line direction of the center axis (the center axis of the accommodation space 13 or the accommodation body 23). That is, since the third connecting structure body 80 has the above-described configuration, the third connecting structure body 80 can also has the function of the second connecting structure body 70. Accordingly, in the oil pressure control device 1, the relative movement between the oil pressure circuit body 10 and the electromagnetic valve 20 in a plane orthogonal to the axis line direction can be also prohibited. The function of the second connecting structure body 70 of the third connecting structure body 80 may be used together with the above-described configuration of the second connecting structure body 70 or may be used instead of the configuration of the second connecting structure body 70.

In this example, the first accommodation body 23A is provided with the first target connection tool 61 and the inner peripheral wall portion 13b of the accommodation space 13 is provided with the first connection tool 62. Then, in this example, the second accommodation body 23B is provided with the third target connection tool 81 and the connection body 50 is provided with the third connection tool 82.

In a case where the oil pressure circuit body 10 and the electromagnetic valve 20 of the oil pressure control device 1 are connected to each other, the first target connection tool 61 protruding from the first accommodation body 23A is guided in the axis line direction along the axis-line-direction groove portion 62A of the oil pressure circuit body 10 (FIG. 12) and then the third target connection tool 81 protruding from the second accommodation body 23B is inserted into the through-hole 51 of the connection body 50 (FIG. 13), in accordance with an operation in which the accommodation body 23 of the electromagnetic valve 20 is accommodated into the accommodation space 13 of the oil pressure circuit body 10. At this time, since the outer peripheral wall portion 23b (the second target connection tool 71) and the inner peripheral wall portion 13b (the second connection tool 72) are fitted to each other by the second connecting structure body 70, the relative movement between the oil pressure circuit body 10 and the electromagnetic valve 20 in a plane orthogonal to the axis line direction is prohibited. Meanwhile, at this time, the relative movement between the first target connection tool 61 and the first connection tool 62 of the first connecting structure body 60 in the axis line direction is not regulated and the third target connection tool 81 and the third connection tool 82 of the third connecting structure body 80 do not engage with each other. In the drawings, for the convenience of description, the inner shape of the electromagnetic valve 20 is omitted.

Next, the electromagnetic valve 20 in the oil pressure control device 1 is rotated about the axis. In the oil pressure control device 1, the first target connection tool 61 is guided along the circumferential groove portion 62B of the oil pressure circuit body 10 (FIG. 14) and the third target connection tool 81 gets over the claw portion 82a of the third connection tool 82 of the connection body 50 to be locked to the claw portion 82a (FIG. 15) together with the rotation operation of the electromagnetic valve 20. In the oil pressure control device 1, the rotation of the electromagnetic valve 20 about the axis is suppressed and the connection between the oil pressure circuit body 10 and the electromagnetic valve 20 is completed together with the operation in which the third target connection tool 81 gets over the claw portion 82a. In the second connecting structure body 70, the outer peripheral wall portion 23b (the second target connection tool 71) is fitted to the inner peripheral wall portion 13b (the second connection tool 72) from the timing of rotating the electromagnetic valve 20. For this reason, in the oil pressure control device 1, the relative movement between the oil pressure circuit body 10 and the electromagnetic valve 20 in a plane orthogonal to the axis line direction is prohibited after the connection of the electromagnetic valve 20 is completed. Further, in the oil pressure control device 1, since the relative movement between the first target connection tool 61 and the first connection tool 62 in the axis line direction is regulated after the connection of the electromagnetic valve 20 is completed, the relative movement between the oil pressure circuit body 10 and the electromagnetic valve 20 in the axis line direction is prohibited. Further, in the oil pressure control device 1, since the third target connection tool 81 and the third connection tool 82 engage with each other to regulate the rotation in a direction opposite to the rotation in the connection operation of the electromagnetic valve 20 after the connection of the electromagnetic valve 20 is completed, the relative rotation about the axis between the oil pressure circuit body 10 and the electromagnetic valve 20 is prohibited. In the drawings, for the convenience of description, the inner shape of the electromagnetic valve 20 is omitted.

As described above, in the connecting structure of the electromagnetic valve 20 and the hydraulic pressure control device (the oil pressure control device 1) of the embodiment, the first connecting structure body 60 and the second connecting structure body 70 provided between the hydraulic pressure circuit body (the oil pressure circuit body 10) and the electromagnetic valve 20 are in charge of the relative movement other than the relative rotation about the axis between the hydraulic pressure circuit body (the oil pressure circuit body 10) and the electromagnetic valve 20 and the third connecting structure body 80 provided between the electromagnetic valve 20 and the connection body 50 is in charge of the relative rotation about the axis. Thus, the connecting structure of the electromagnetic valve 20 and the hydraulic pressure control device (the oil pressure control device 1) can prohibit the relative movement (including the relative rotation) between the hydraulic pressure circuit body (the oil pressure circuit body 10) and the electromagnetic valve 20 in all directions without using a fixing tool such as a bolt. Then, the connecting structure of the electromagnetic valve 20 and the hydraulic pressure control device (the oil pressure control device 1) can keep a predetermined connection strength between the hydraulic pressure circuit body (the oil pressure circuit body 10) and the electromagnetic valve 20 even when an input load is applied thereto from the outside in the traveling state by a simple configuration that does not need such a fixing tool. For this reason, the connecting structure of the electromagnetic valve 20 and the hydraulic pressure control device (the oil pressure control device 1) can keep a predetermined connection state of the electromagnetic valve 20 with respect to the hydraulic pressure circuit body (the oil pressure circuit body 10) with a simple configuration.

Further, since the connecting structure of the electromagnetic valve 20 and the hydraulic pressure control device (the oil pressure control device 1) have a small configuration involving with the connection between the hydraulic pressure circuit body (the oil pressure circuit body 10) and the electromagnetic valve 20 compared with the related art that requires a fixing tool, the positional accuracy between the hydraulic pressure circuit body (the oil pressure circuit body 10) and the electromagnetic valve 20 can be improved after the connection therebetween is completed. For this reason, since the connecting structure of the electromagnetic valve 20 and the hydraulic pressure control device (the oil pressure control device 1) can suppress a difference in hydraulic pressure caused by the positional deviation between the hydraulic pressure circuit body (the oil pressure circuit body 10) and the electromagnetic valve 20, the accuracy of controlling the control target can be improved.

Further, since the connecting structure of the electromagnetic valve 20 and the hydraulic pressure control device (the oil pressure control device 1) have a small configuration involving with the connection between the hydraulic pressure circuit body (the oil pressure circuit body 10) and the electromagnetic valve 20 compared with the related art that needs a fixing tool and completes the connection therebetween only by the insertion operation and the rotation operation of the electromagnetic valve 20, the attachment workability of the hydraulic pressure control device (the oil pressure control device 1) can be improved. Then, in this example, the electrical connection between the valve-side contact point 24a of the electromagnetic valve 20 and the valve contact point 41 of the conductive member 40 can be also completed in accordance with the rotation operation. For this reason, since the connecting structure of the electromagnetic valve 20 and the hydraulic pressure control device (the oil pressure control device 1) of this example can abolish the electrical connection operation between the electromagnetic valve 20 and the conductive member 40 compared with the related art, the attachment workability of the hydraulic pressure control device (the oil pressure control device 1) can be further improved. In this way, since the connecting structure of the electromagnetic valve 20 and the hydraulic pressure control device (the oil pressure control device 1) can improve the attachment workability, a decrease in manufacturing cost of the hydraulic pressure control device (the oil pressure control device 1) can be realized.

Further, since the connecting structure of the electromagnetic valve 20 and the hydraulic pressure control device (the oil pressure control device 1) can provide a configuration involving with the connection between the hydraulic pressure circuit body (the oil pressure circuit body 10) and the electromagnetic valve 20 in, for example, a dead space compared with the related art that needs a fixing tool, an increase in structure size of the hydraulic pressure circuit body (the oil pressure circuit body 10) or the electromagnetic valve 20 (that is, an increase in structure size of the hydraulic pressure control device) can be suppressed. Rather, since the connecting structure of the electromagnetic valve 20 and the hydraulic pressure control device (the oil pressure control device 1) do not need a fixing tool, a space dedicated for the fixing tool is not need and thus a decrease in structure size of the hydraulic pressure control device (the oil pressure control device 1) can be realized. In this way, since the connecting structure of the electromagnetic valve 20 and the hydraulic pressure control device (the oil pressure control device 1) can suppress an increase in structure size of the hydraulic pressure control device (the oil pressure control device 1) or realize a decrease in structure size thereof, for example, the amount of a material to be used decreases. As a result, a decrease in manufacturing cost can be realized.

Incidentally, even when an input load is applied to the electromagnetic valve 20 from the outside in the hydraulic pressure control device (the oil pressure control device 1), there is a low possibility that the direction of the input load becomes a direction in which the electromagnetic valve 20 rotates about the axis relatively to the hydraulic pressure circuit body (the oil pressure circuit body 10). For this reason, in the hydraulic pressure control device (the oil pressure control device 1), a difference in strength may be set between the hydraulic pressure circuit body (the oil pressure circuit body 10) and the connection body 50 (particularly, the first connection body 50A). For example, the hydraulic pressure circuit body (the oil pressure circuit body 10) is molded from a high-strength material having strength higher than that of the connection body 50 (particularly, the first connection body 50A). In this case, for example, the connection body 50 is molded from an insulation material such as a synthetic resin material and the hydraulic pressure circuit body (the oil pressure circuit body 10) is molded from a metal material. That is, in the connecting structure of the electromagnetic valve 20 and the hydraulic pressure control device (the oil pressure control device 1), the first connecting structure body 60 and the second connecting structure body 70 using the hydraulic pressure circuit body (the oil pressure circuit body 10) having strength higher than that of the connection body 50 are in charge of the relative movement other than the relative rotation about the axis between the hydraulic pressure circuit body (the oil pressure circuit body 10) and the electromagnetic valve 20 and the third connecting structure body 80 provided between the electromagnetic valve 20 and the connection body 50 having strength lower than that of the hydraulic pressure circuit body (the oil pressure circuit body 10) is in charge of the relative rotation which does not occur frequently compared with the relative movement. Accordingly, the electromagnetic valve 20 can be strongly connected to the hydraulic pressure circuit body (the oil pressure circuit body 10) by the high-strength hydraulic pressure circuit body (the oil pressure circuit body 10) without using a fixing tool. Then, in the connecting structure of the electromagnetic valve 20 and the hydraulic pressure control device (the oil pressure control device 1), since the electromagnetic valve 20 is strongly connected to the hydraulic pressure circuit body (the oil pressure circuit body 10) by the connection body 50, it is possible to reduce a load applied from the electromagnetic valve 20 to the connection body 50 when an input load is applied to the electromagnetic valve 20 from the outside. For this reason, the connecting structure of the electromagnetic valve 20 and the hydraulic pressure control device (the oil pressure control device 1) can improve the durability of the connection body 50 and the durability of the control unit 30 and the conductive member 40 held therein. Further, in the connecting structure of the electromagnetic valve 20 and the hydraulic pressure control device (the oil pressure control device 1), a locking mechanism formed of a synthetic resin material is not particularly provided to prohibit the relative movement other than the relative rotation between the hydraulic pressure circuit body (the oil pressure circuit body 10) and the electromagnetic valve 20 after the connection therebetween is completed and the relative movement can be prohibited by the high-strength hydraulic pressure circuit body (the oil pressure circuit body 10). Even in this regard, the durability can be improved.

Further, since the hydraulic pressure circuit body (the oil pressure circuit body 10) is molded from a metal material, a dimensional tolerance can be reduced compared with the case where a synthetic resin material or the like is used. Thus, the connecting structure of the electromagnetic valve 20 and the hydraulic pressure control device (the oil pressure control device 1) can further improve the positional accuracy between the hydraulic pressure circuit body (the oil pressure circuit body 10) and the electromagnetic valve 20 after the connection therebetween is completed.

First Modified Example

This modified example has a configuration in which two third connecting structure bodies 80 provided in each electromagnetic valve 20 of the above-described embodiment are replaced by one third connecting structure body 80. Reference Numeral 2 of FIG. 16 indicates an oil pressure control device which is an example of a hydraulic pressure control device of the modified example. Further, the same reference numerals will be given to the same components as those of the embodiment and the same description as that of the embodiment will be omitted for the convenience of description.

The oil pressure control device 2 of the modified example has a configuration in which two third connecting structure bodies 80 provided in each electromagnetic valve 20 of the oil pressure control device 1 of the above-described embodiment are provided as one third connecting structure body 80. In the oil pressure control device 2, the electromagnetic valve 20 similar to the embodiment is used. For this reason, the third target connection tool 81 is provided at two positions of the electromagnetic valve 20. Meanwhile, in the oil pressure control device 2, the connection body 50 of the oil pressure control device 1 of the embodiment is replaced by a connection body 150 and thus only one third connecting structure body 80 is disposed.

Figure 16:
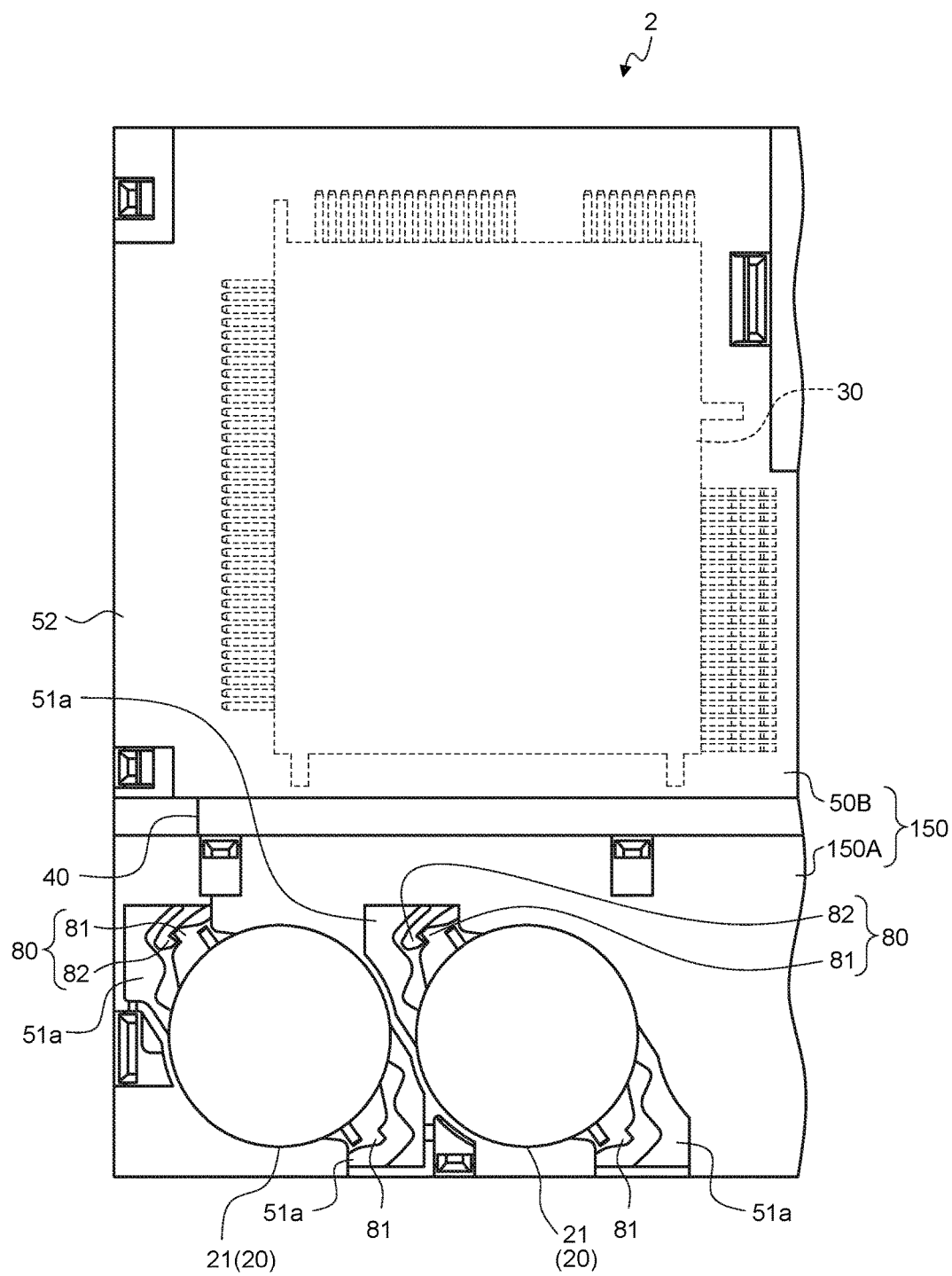
FIG. 16 is a front view illustrating an example of a hydraulic pressure control device including a connecting structure of an electromagnetic valve according to a first modified example.
Figure 17:
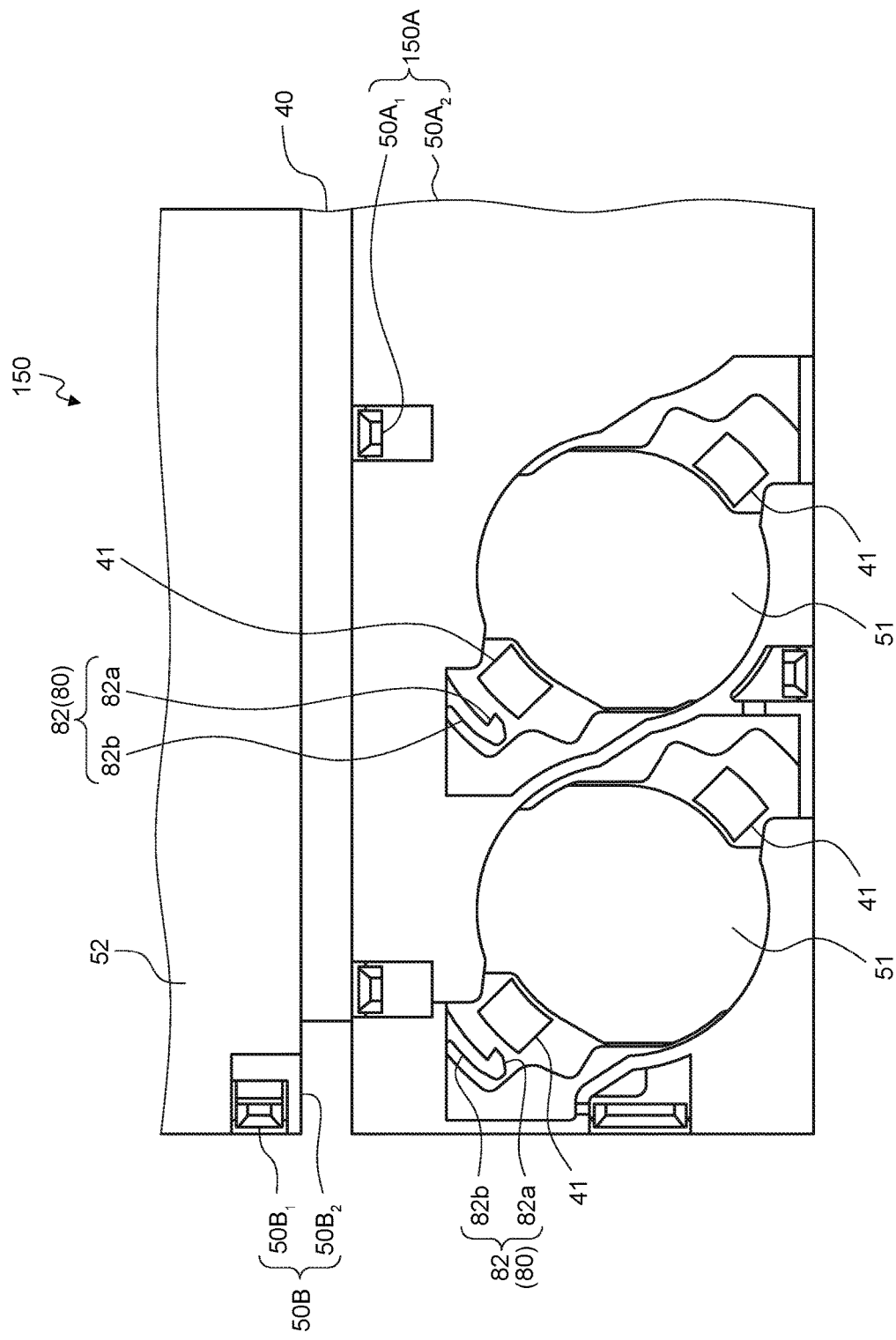
FIG. 17 is a front view illustrating a connection body according to the first modified example.

The connection body 150 of the modified example has a configuration in which the first connection body 50A of the connection body 50 of the embodiment is replaced by a first connection body 150A. Then, the first connection body 150A has a configuration in which two third connection tools 82 provided at each through-hole 51 in the first connection body 50A of the embodiment are provided as one third connection tool 82 (FIGS. 16 and 17). Accordingly, in the electromagnetic valve 20, only one third target connection tool 81 engages with the third connection tool 82. Thus, in the oil pressure control device 2 of the modified example, only one third connecting structure body 80 is provided to correspond to one electromagnetic valve 20. In the oil pressure control device 2, when the electromagnetic valve 20 is assembled similarly to the embodiment, one third target connection tool 81 and the third connection tool 82 engage with each other and thus the relative rotation about the axis between the oil pressure circuit body 10 and the electromagnetic valve 20 can be prohibited.

In this way, although the hydraulic pressure control device (the oil pressure control device 2) of the modified example includes only one third connecting structure body 80, the third target connection tool 81 and the third connection tool 82 constituting the third connecting structure body 80 can engage with each other. Accordingly, the relative rotation of the electromagnetic valve 20 about the axis can be prohibited similarly to the hydraulic pressure control device (the oil pressure control device 1) of the above-described embodiment.

Further, since the hydraulic pressure control device (the oil pressure control device 1) of the embodiment includes the plurality of third connecting structure bodies 80, the design tolerance involving with the shapes or the arrangement of the third target connection tools 81 and the third connection tools 82 of all third connecting structure bodies 80 needs to be decreased. Here, for example, even when the third target connection tool 81 and the third connection tool 82 of one third connecting structure body 80 can engage with each other, there is a possibility that the third target connection tools 81 and the third connection tools 82 of the other third connecting structure bodies 80 cannot engage with one another. However, since the hydraulic pressure control device (the oil pressure control device 2) of the modified example includes only one third connecting structure body 80, the third target connection tool 81 and the third connection tool 82 can engage with each other even when the design tolerance is managed with difficulty as in the hydraulic pressure control device (the oil pressure control device 1) of the embodiment. For this reason, the hydraulic pressure control device (the oil pressure control device 2) of the modified example can have the third connecting structure body 80 which suppresses an increase in manufacturing cost compared with the hydraulic pressure control device (the oil pressure control device 1) of the embodiment.

Furthermore, since the first connection body 150A of the modified example has a configuration in which the third connection tools 82 provided in the first connection body 50A of the embodiment are provided as one third connection tool 82, both third target connection tools 81 of the electromagnetic valve 20 can be accommodated into the through-holes 51 from the insertion portions 51a similarly to the hydraulic pressure control device (the oil pressure control device 1) of the embodiment. Then, in the conductive member 40 of the modified example, the valve contact point 41 is disposed to match each position of both third target connection tools 81 of the electromagnetic valve 20 similarly to the hydraulic pressure control device (the oil pressure control device 1) of the embodiment. Accordingly, even when the terminal 24 is included in only one of the third target connection tools 81, the valve-side contact point 24a of the terminal 24 can be electrically connected to the valve contact point 41. For this reason, although the hydraulic pressure control device (the oil pressure control device 2) of the modified example includes only one third connecting structure body 80, the electromagnetic valve 20 can be assembled while being shifted by 180° about the axis.

Second Modified Example

In this modified example, only one third connecting structure body 80 is provided in each electromagnetic valve 20 similarly to the hydraulic pressure control device (the oil pressure control device 2) of the above-described first modified example. Here, in the modified example, the electromagnetic valve 20 is replaced by an electromagnetic valve 120 illustrated in FIGS. 18 and 19. The electromagnetic valve 120 used in the modified example has a configuration in which one of two third target connection tools 81 in the electromagnetic valve 20 of the embodiment or the first modified example is removed (FIG. 19). In the electromagnetic valve 120, the terminal 24 is disposed at the inside of one third target connection tool 81 provided therein. Reference Numeral 3 of FIG. 18 indicates an oil pressure control device which is an example of a hydraulic pressure control device of the modified example. Further, the same reference numerals will be given to the same components as those of the embodiment or the first modified example and the same description as that of the embodiment or the first modified example will be omitted for the convenience of description.

Figure 18:
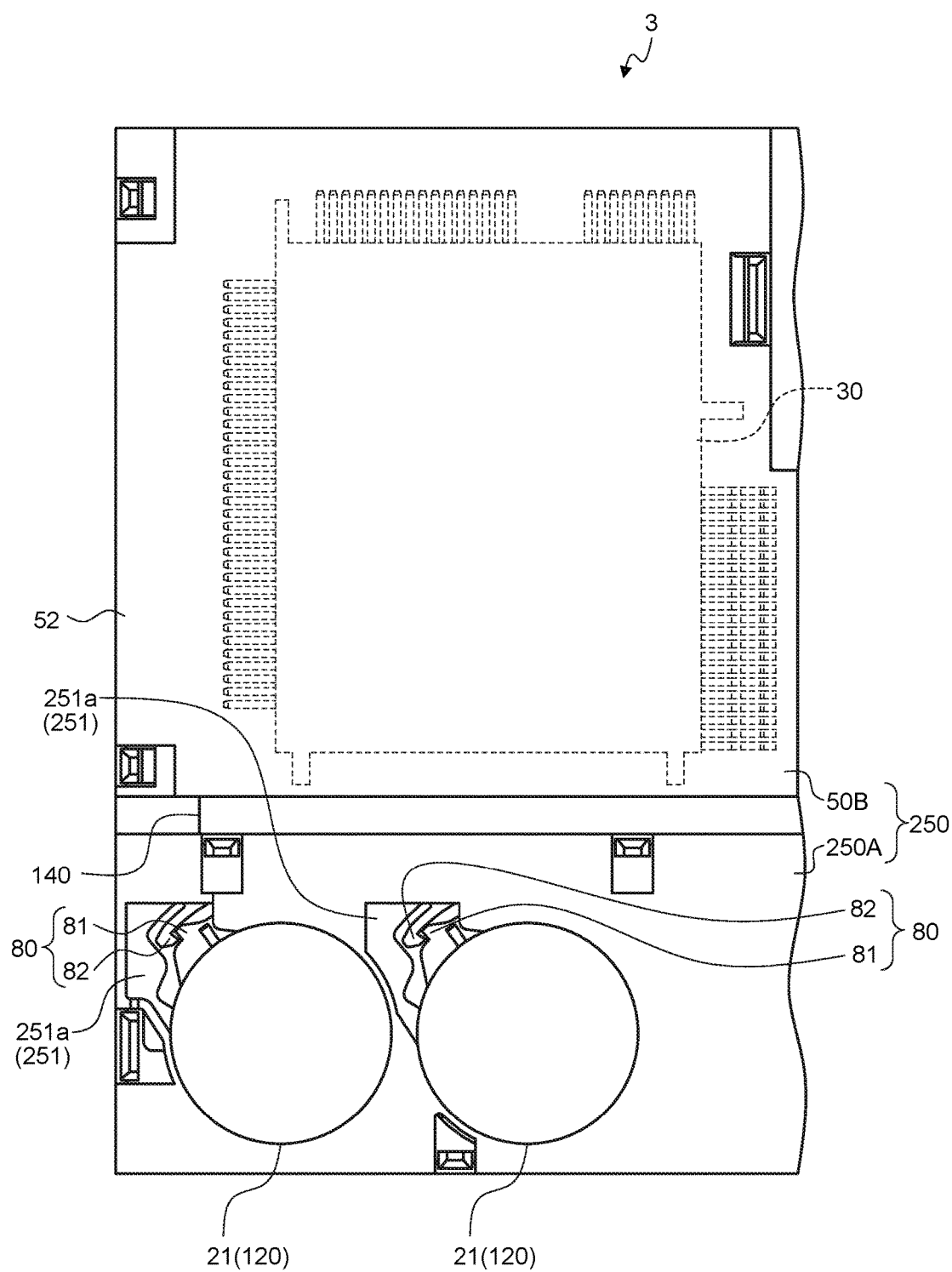
FIG. 18 is a front view illustrating an example of a hydraulic pressure control device including a connecting structure of an electromagnetic valve according to a second modified example.
Figure 19:
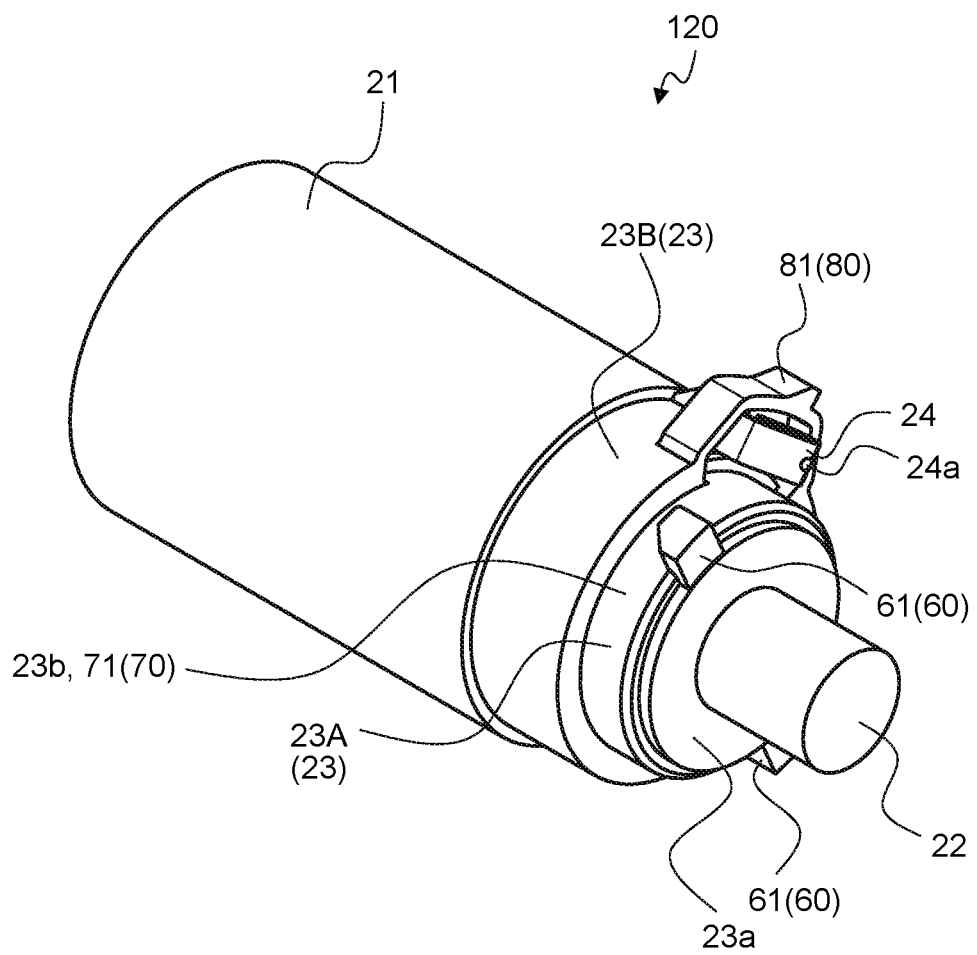
FIG. 19 is a perspective view illustrating the electromagnetic valve according to the second modified example.
Figure 20:
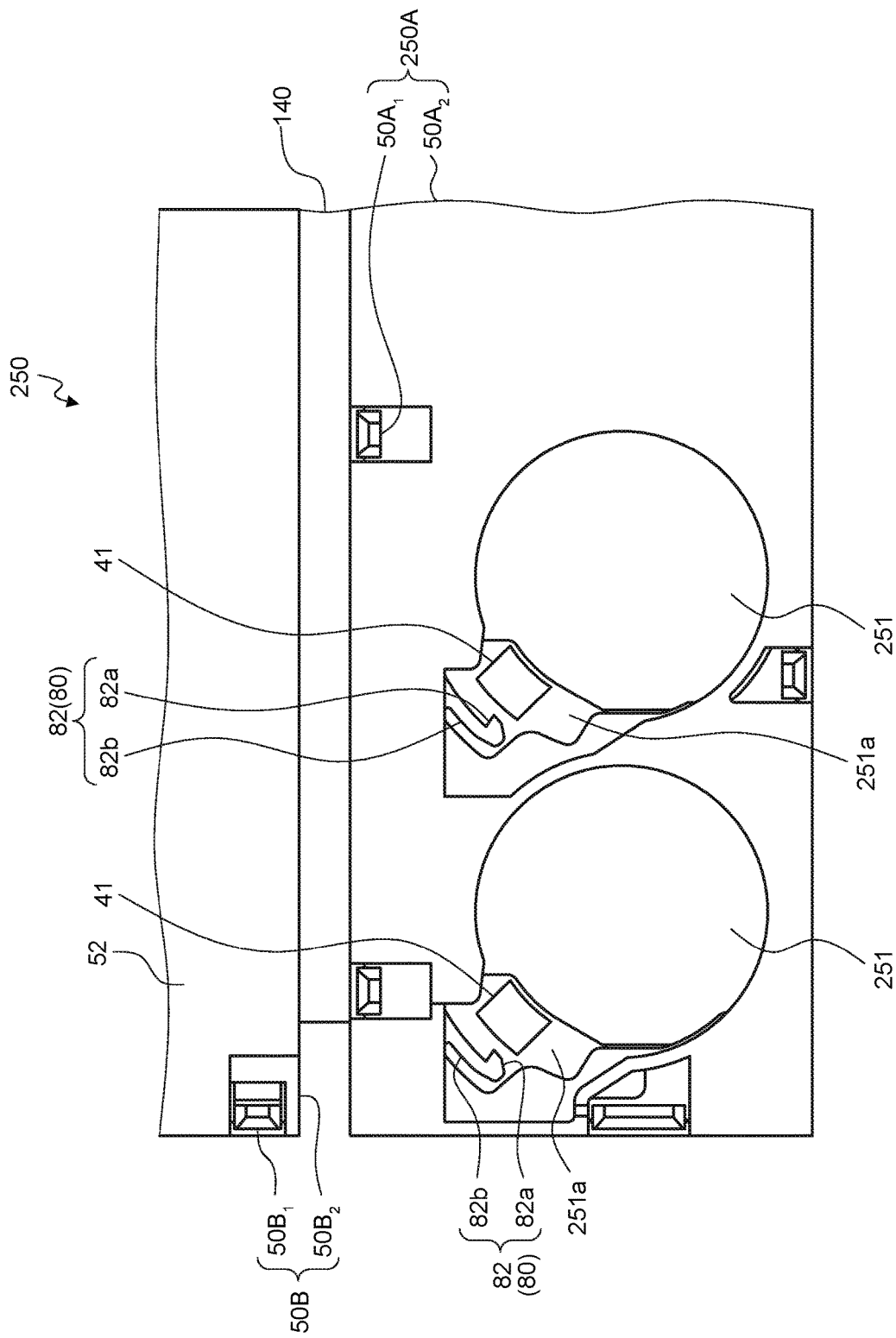
FIG. 20 is a front view illustrating a connection body according to the second modified example.

The oil pressure control device 3 of the modified example has a configuration in which the connection body 150 of the oil pressure control device 2 of the first modified example is replaced by a connection body 250 and the conductive member 40 thereof is replaced by a conductive member 140 (FIGS. 18 and 20).

The connection body 250 of the modified example has a configuration in which the first connection body 150A of the connection body 150 of the first modified example is replaced by a first connection body 250A. Then, the first connection body 250A has a configuration in which the through-hole 51 of each of the first connection bodies 150A of the first modified example is replaced by a through-hole 251.

The through-hole 251 is used to insert the accommodation body 23 of the electromagnetic valve 120 therethrough similarly to the through-hole 51 of the first modified example and is formed in a shape avoiding one third target connection tool 81 and two first target connection tools 61 of the electromagnetic valve 120. For this reason, the through-hole 251 includes an insertion portion 251a through which the third target connection tool 81 can be inserted similarly to the through-hole 51 of the first modified example. Here, the through-hole 251 of the modified example includes the insertion portion 251a which is provided only at one position corresponding to the third target connection tool 81 of the electromagnetic valve 120. Here, the accommodation body 23 cannot be inserted unless the position of the insertion portion 251a matches the position of the third target connection tool 81. The third connection tool 82 is disposed at the inside of the insertion portion 251a. Thus, in the oil pressure control device 3 of the modified example, only one third connecting structure body 80 is provided in each electromagnetic valve 120. In the oil pressure control device 3, when the electromagnetic valve 120 is inserted into the through-hole 251 while the position of the insertion portion 251a matches the position of the third target connection tool 81 and the electromagnetic valve 120 is rotated about the axis, the third target connection tool 81 and the third connection tool 82 engage with each other and thus the relative rotation about the axis between the oil pressure circuit body 10 and the electromagnetic valve 120 can be prohibited.

The conductive member 140 of the modified example is different from the conductive member 40 of the embodiment or the first modified example in that one of two valve contact points 41 provided in each electromagnetic valve 20 is removed. The conductive member 140 is formed so that the valve contact point 41 is disposed only at the inside of the insertion portion 251a.

In this way, since the hydraulic pressure control device (the oil pressure control device 3) of the modified example includes only one third connecting structure body 80, the relative rotation about the axis of the electromagnetic valve 120 can be prohibited similarly to the hydraulic pressure control device (the oil pressure control device 2) of the first modified example.

Further, since the hydraulic pressure control device (the oil pressure control device 3) of the modified example includes only one third connecting structure body 80, an increase in manufacturing cost necessary for the third connecting structure body 80 can be suppressed similarly to the hydraulic pressure control device (the oil pressure control device 2) of the first modified example. Then, since the hydraulic pressure control device (the oil pressure control device 3) is different from the hydraulic pressure control device (the oil pressure control device 2) of the first modified example in that one of the valve contact points 41 is removed, a decrease in manufacturing cost can be realized in this regard.

Furthermore, since the electromagnetic valve 120 can be assembled only in one specific direction in accordance with the shape of the through-hole 251, the hydraulic pressure control device (the oil pressure control device 3) of the modified example can prevent the erroneous assembly of the electromagnetic valve 120.

Third Modified Example

Figure 21:
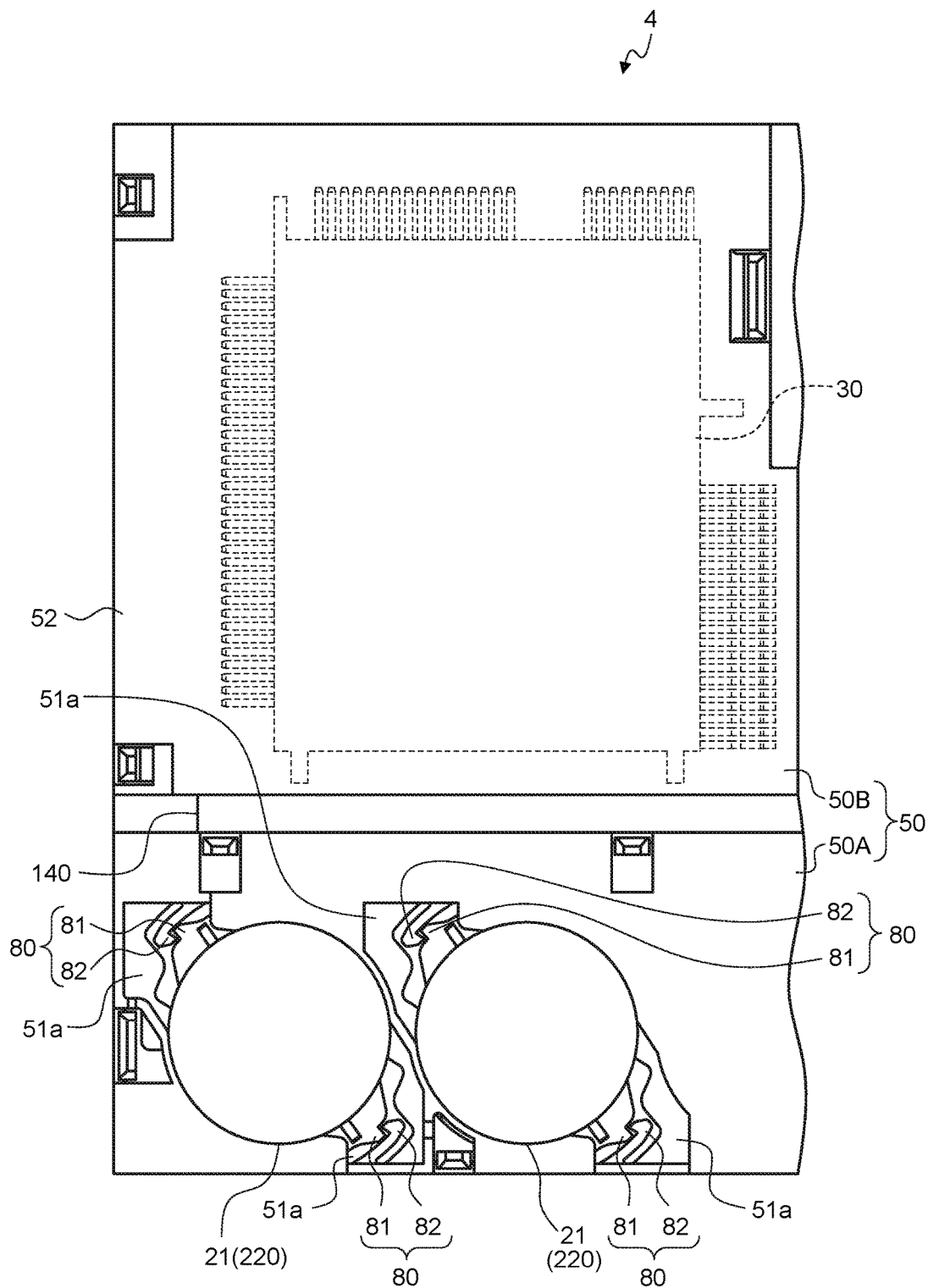
FIG. 21 is a front view illustrating an example of a hydraulic pressure control device including a connecting structure of an electromagnetic valve according to a third modified example.

This modified example is used to prevent the erroneous assembly of the electromagnetic valve 20. The electromagnetic valve 20 of the above-described embodiment or the first modified example has a configuration in which the terminal 24 is included in only one of two third target connection tools 81. For this reason, in the hydraulic pressure control device (the oil pressure control device 1) of the embodiment or the hydraulic pressure control device (the oil pressure control device 2) of the first modified example, one valve contact point 41 is disposed at the inside of two insertion portions 51a so that the valve-side contact point 24a of the terminal 24 is electrically connected to the valve contact point 41 of the conductive member 40 even when the electromagnetic valve 20 is assembled while being shifted by 180° about the axis. That is, in the hydraulic pressure control device (the oil pressure control device 1) of the embodiment or the hydraulic pressure control device (the oil pressure control device 2) of the first modified example, the unused valve contact point 41 is provided at one position of each electromagnetic valve 20 and thus the erroneous assembly of the electromagnetic valve 20 is prevented. However, there is a possibility that the unused valve contact point 41 may cause an increase in manufacturing cost. Here, in the modified example, the erroneous assembly of the electromagnetic valve 20 can be prevented while an increase in manufacturing cost is suppressed. Reference Numeral 4 of FIG. 21 indicates an oil pressure control device which is an example of a hydraulic pressure control device of the modified example. Further, the same reference numerals will be given to the same components as those of the embodiment or the first and second modified examples and the same description as those of the embodiment or the first and second modified examples will be omitted for the convenience of description.

Figure 22:
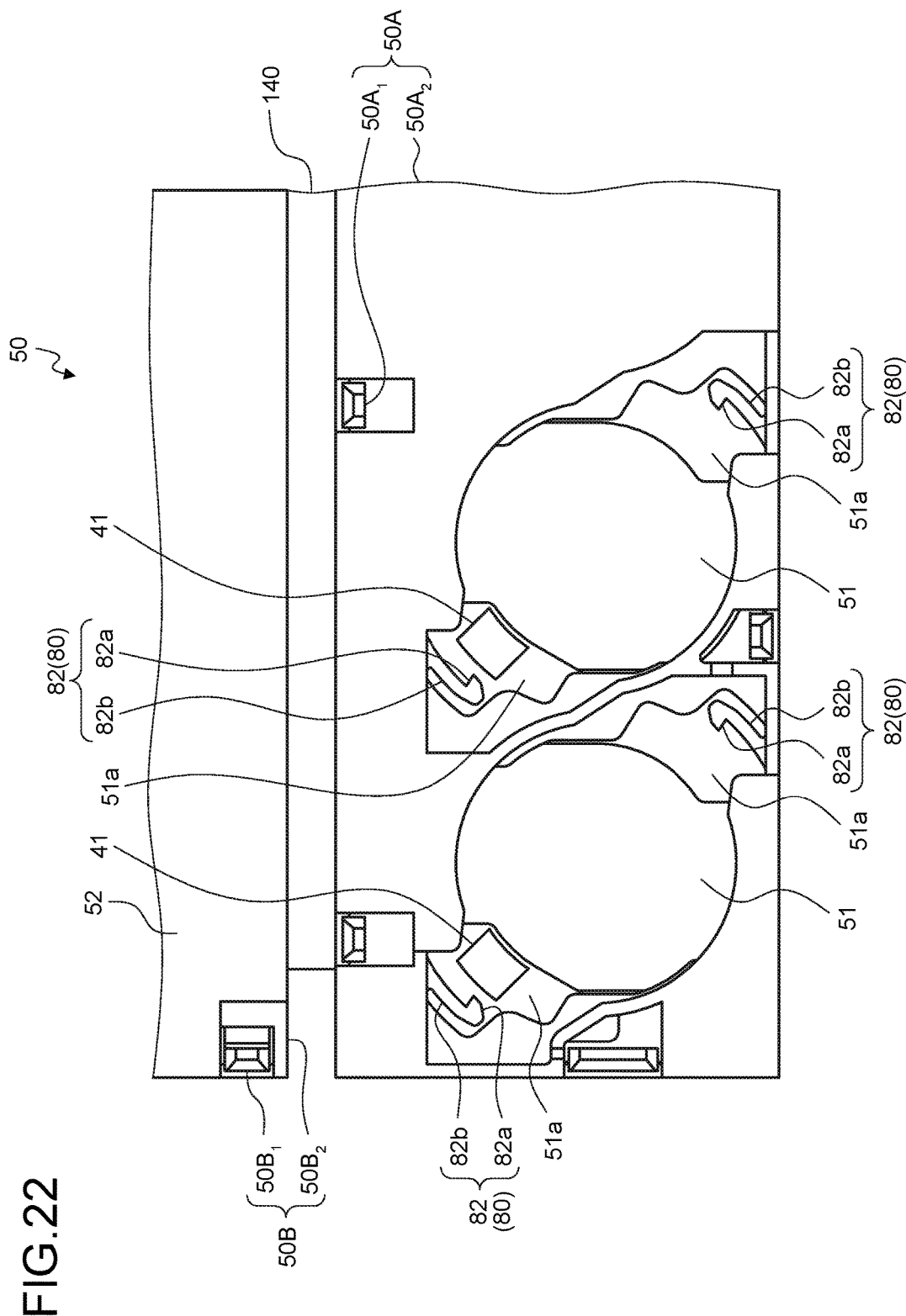
FIG. 22 is a front view illustrating a connection body according to the third modified example.

The oil pressure control device 4 of the modified example is different from the oil pressure control device 1 of the above-described embodiment or the oil pressure control device 2 of the first modified example in that the conductive member 40 is replaced by the conductive member 140 of the second modified example (FIGS. 21 and 22) and the erroneous assembly preventing mechanism of the electromagnetic valve 20 is provided between the electromagnetic valve 20 and the oil pressure circuit body 10 or the connection body 50 (150). For this reason, the valve contact point 41 is disposed only at one of two insertion portions 51a of the through-hole 51 in the oil pressure control device 4 (FIG. 22).

Here, the erroneous assembly preventing mechanism is described on the basis of the oil pressure control device 1 of the embodiment. However, even when the erroneous assembly preventing mechanism is described on the basis of the oil pressure control device 2 of the first modified example, the same effect as that of the erroneous assembly preventing mechanism can be obtained.

The erroneous assembly preventing mechanism includes a first engagement portion and a second engagement portion which are formed and arranged to engage with each other only when the electromagnetic valve is assembled at a normal assembly position according to a design. For this reason, since the erroneous assembly preventing mechanism can prevent the erroneous assembly of the electromagnetic valve, the electromagnetic valve can be assembled only at the normal assembly position according to a design. In the oil pressure control device 4 of the modified example, the electromagnetic valve 20, the oil pressure circuit body 10, and the connection body 50 of the oil pressure control device 1 of the embodiment are appropriately replaced in response to the configurations of the first engagement portion and the second engagement portion of the erroneous assembly preventing mechanism.

For example, the first engagement portion is provided as a protrusion portion which protrudes from one of the electromagnetic valve and the oil pressure circuit body or the connection body. Then, the second engagement portion is provided as a groove portion, a notch portion, or a through-hole portion which is provided at the other thereof and into which the first engagement portion can be inserted only when the electromagnetic valve is assembled at the normal assembly position according to a design.

The first engagement portion and the second engagement portion may be provided only for the erroneous assembly preventing function or may be also provided for the other functions different from the erroneous assembly preventing function. In the description below, the latter case will be described in detail.

For example, the first connecting structure body 60 is provided between the electromagnetic valve and the oil pressure circuit body. Then, in the first connecting structure body 60, the first target connection tool 61 serving as the protrusion portion and the first connection tool 62 serving as the groove portion are formed to engage with each other. For this reason, in the oil pressure control device 4 of the modified example, the first connecting structure body 60 is also used as the erroneous assembly preventing mechanism.

When one first connecting structure body 60 is provided, the first target connection tool 61 is caught by the oil pressure circuit body or the connection body at a position other than the normal assembly position. Accordingly, the first target connection tool 61 and the first connection tool 62 are formed and arranged so that the electromagnetic valve cannot be assembled to the oil pressure circuit body and the connection body. Accordingly, the first connecting structure body 60 can be also used as the erroneous assembly preventing mechanism.

Meanwhile, when the first connecting structure bodies 60 are disposed at the same interval about the axis similarly to the oil pressure control device 1 of the embodiment in the case where the first connecting structure body 60 is provided at a plurality of positions, all first target connection tools 61 can be inserted into the axis-line-direction groove portions 62A of the first connection tools 62 at a predetermined position different from the normal assembly position even when the electromagnetic valve is rotated about the axis from the normal assembly position. For this reason, when the plurality of first connecting structure bodies 60 are used as the erroneous assembly preventing mechanism in the oil pressure control device 4 of the modified example, the plurality of first connecting structure bodies are disposed so that an angle (that is, a center angle) forming a gap (that is, a circular-arc length) about the axis of one first connecting structure body 60 with respect to at least one of the first connecting structure bodies 60 is different from an angle forming a gap about the axis of the other first connecting structure body 60 with respect thereto. Accordingly, since the erroneous assembly preventing mechanism can insert all first target connection tools 61 into the axis-line-direction groove portions 62A of the first connection tools 62 only when the electromagnetic valve is located at one specific position (the normal assembly position) about the axis, the erroneous assembly of the electromagnetic valve can be prevented.

Figure 23:
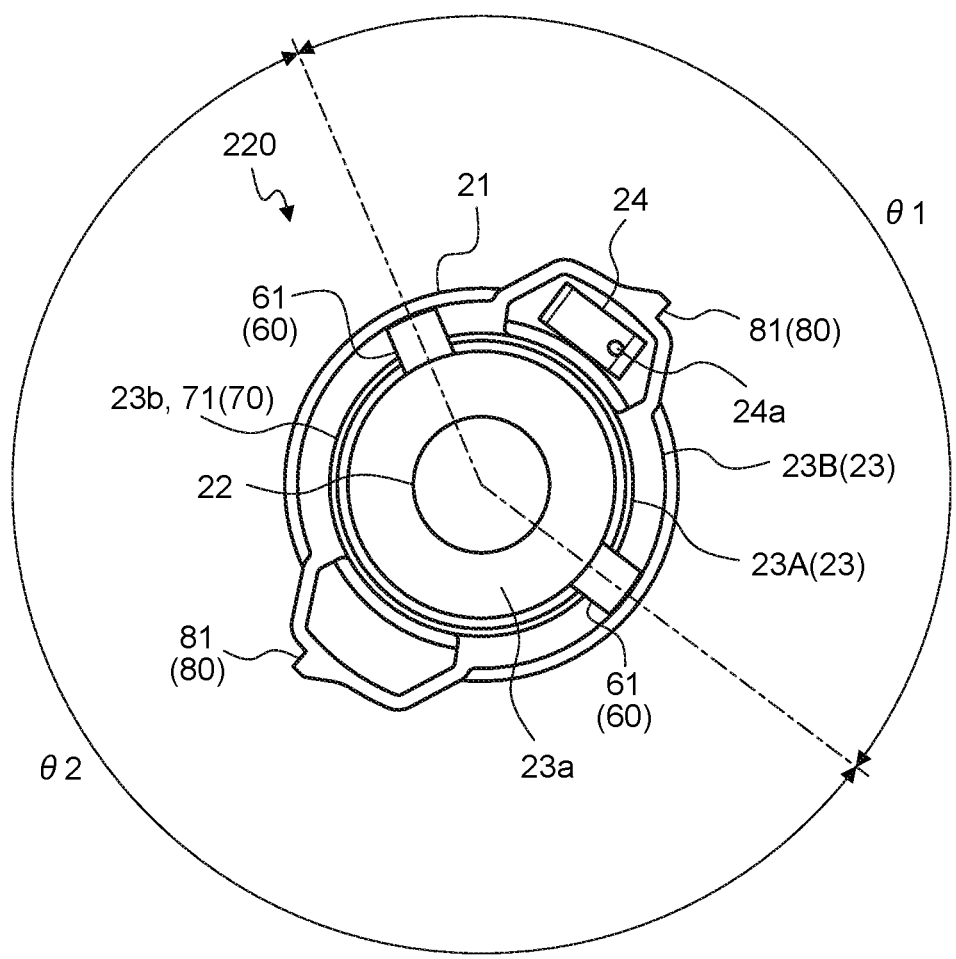
FIG. 23 is a diagram illustrating an electromagnetic valve according to the third modified example when viewed from a valve body.

Specifically, the oil pressure control device 4 of the modified example has a configuration in which the electromagnetic valve 20 of the oil pressure control device 1 of the embodiment is replaced by an electromagnetic valve 220 as below (FIG. 23). The electromagnetic valve 220 has a configuration in which a protrusion portion serving as the first engagement portion of the erroneous assembly preventing mechanism is provided in the electromagnetic valve 20 of the embodiment. In the electromagnetic valve 220 of this example, the first target connection tools 61 are disposed about the axis so that one angle (a center angle) θ1 forming one gap about the axis of each of the first target connection tools 61 is smaller than the other angle (a center angle) θ2 forming the other gap. In the oil pressure control device 4 of the modified example, the first connection tools 62 are disposed to correspond to the positions of the first target connection tools 61. The first connection tool 62 corresponds to a groove portion serving as the second engagement portion of the erroneous assembly preventing mechanism.

Figure 24:
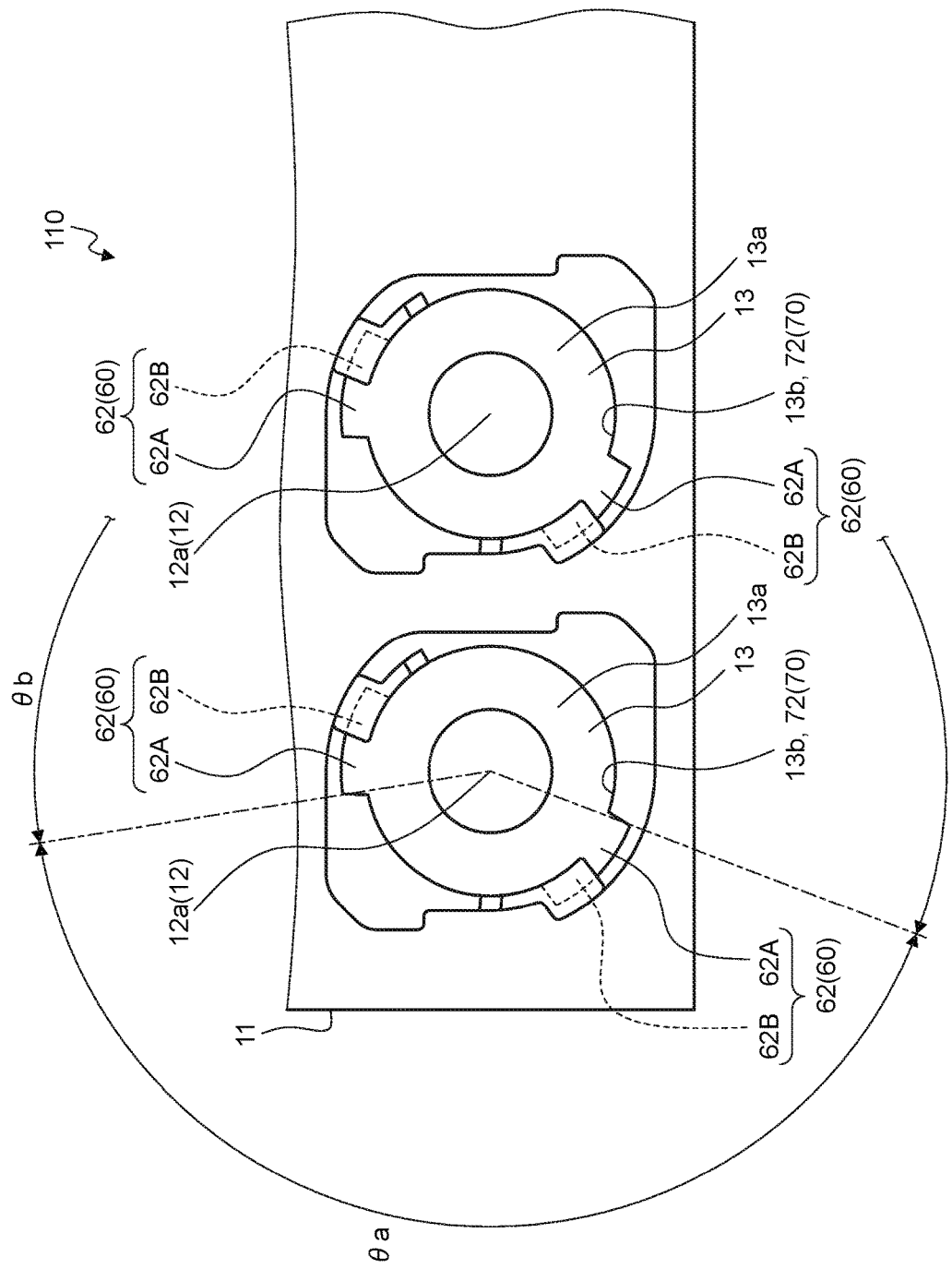
FIG. 24 is a front view illustrating a hydraulic pressure circuit body according to the third modified example.

The first connection tool 62 of the modified example is provided in an oil pressure circuit body 110 similarly to the oil pressure control device 1 of the embodiment (FIG. 24). The oil pressure circuit body 110 has a configuration in which two first connection tools 62 of the oil pressure circuit body 10 of the embodiment are disposed differently. Here, one angle (a center angle) θa forming a gap about the axis therebetween is set to θ1 and the other angle (a center angle) θb is set to θ2.

Figure 25:
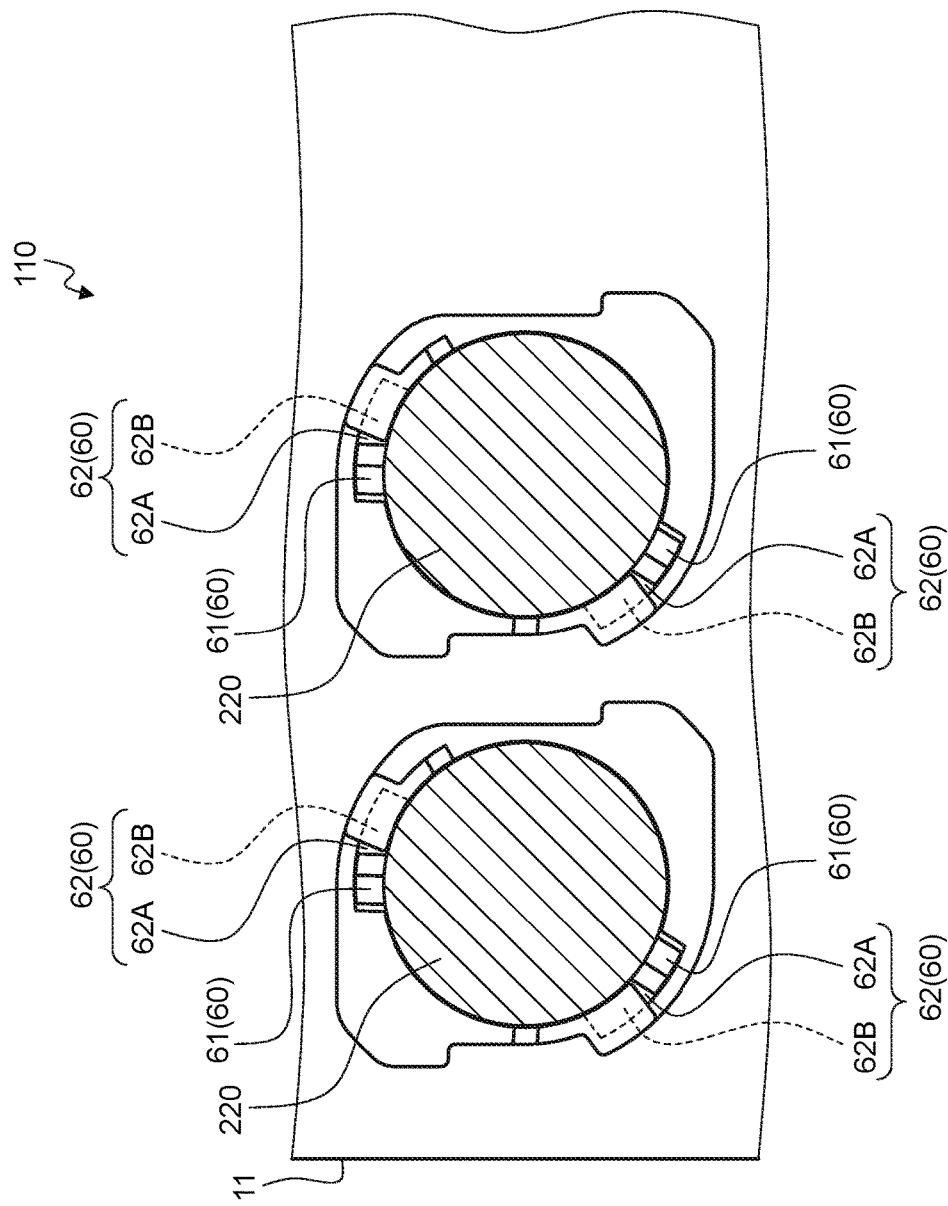
FIG. 25 is a front view illustrating a state of a first connecting structure body (an erroneous assembly preventing mechanism) when the electromagnetic valve is assembled to a normal assembly position and the electromagnetic valve is completely inserted in the axis line direction.

Since the oil pressure control device 4 of the modified example includes the first connecting structure bodies 60 having different center angles, the first target connection tools 61 are respectively inserted into the axis-line-direction groove portions 62A of the first connection tools 62 (FIG. 25) and thus the electromagnetic valve 220 is correctly assembled to the oil pressure circuit body 110 and the connection body 50 when the electromagnetic valve 220 is assembled at the normal assembly position. Meanwhile, in the oil pressure control device 4, the electromagnetic valve 220 is assembled to the normal assembly position while being shifted by 180°. Accordingly, even when one first target connection tool 61 is inserted into the axis-line-direction groove portion 62A of one first connection tool 62, the other first target connection tool 61 is caught by the wall face of the oil pressure circuit body 110 while not being inserted into the axis-line-direction groove portion 62A of the other first connection tool 62 (FIG. 26) and thus the electromagnetic valve 220 cannot be assembled to the oil pressure circuit body 110 and the connection body 50.

In this way, since the hydraulic pressure control device (the oil pressure control device 4) of the modified example can prevent the erroneous assembly of the electromagnetic valve 220, the electromagnetic valve 220 is assembled at the normal assembly position. Thus, the hydraulic pressure control device (the oil pressure control device 4) can electrically connect the valve-side contact point 24a of the terminal 24 to the valve contact point 41 at one position of the conductive member 40 even when only one terminal 24 is provided at the electromagnetic valve 220. Thus, since there is no need to provide the unused valve contact point 41 in the hydraulic pressure control device (the oil pressure control device 4), a decrease in manufacturing cost can be realized. Further, the hydraulic pressure control device (the oil pressure control device 4) can electrically connect one valve-side contact point 24a to the valve contact point 41 only at one position of the conductive member 40 even when the terminal 24 is provided at two positions of the electromagnetic valve 220.

Incidentally, the oil pressure control device 4 of the modified example is provided with the third connecting structure body 80. Then, in the third connecting structure body 80, the third target connection tool 81 serving as the protrusion portion and the third connection tool 82 serving as the groove portion are formed to engage with each other. For this reason, although not illustrated in the drawings, in the oil pressure control device 4 of the modified example, the third connecting structure body 80 can be also used as the erroneous assembly preventing mechanism. In this case, when only one third connecting structure body 80 is provided, the third target connection tool 81 is caught by the oil pressure circuit body or the connection body at a position other than the normal assembly position. Accordingly, the third target connection tool 81 and the third connection tool 82 are formed and arranged so that the electromagnetic valve cannot be assembled to the oil pressure circuit body and the connection body. Meanwhile, when the third connecting structure body 80 is provided at a plurality of positions, the third connecting structure bodies 80 are disposed so that an angle (a center angle) forming a gap (a circular-arc length) about the axis of one third connecting structure body 80 with respect to at least one of the third connecting structure bodies 80 is different from an angle forming a gap about the axis of the other third connecting structure body 80 with respect thereto. The oil pressure control device 4 of the modified example can obtain the same effect as that of the above-described example even in such a configuration.

Further, in the above-described example, since two first target connection tools 61 and two first connection tools 62 are formed to have the same shape, one of a gap about the axis of two first target connection tools 61 and a gap about the axis of two first connection tools 62 becomes a narrow angle (θ1, θa) and the other thereof becomes an obtuse angle (θ2, θb). On the contrary, although not illustrated in the drawings, in the hydraulic pressure control device (the oil pressure control device 4) of the modified example, one of two first target connection tools 61 may be formed in a different shape and one of two first connection tools 62 may be formed in a different shape. Thus, only when the combination of the first target connection tool 61 and the first connection tool 62 is reversed, the first target connection tool 61 may not be inserted into the axis-line-direction groove portion 62A of the first connection tool 62. In this case, two first target connection tools 61 may be disposed while being shifted by 180° about the axis and two first connection tools 62 may be disposed while being shifted by 180° about the axis. When the electromagnetic valve including two first target connection tools 61 having different shapes is assembled at the normal assembly position, one first target connection tool 61 is inserted into the axis-line-direction groove portion 62A of one first connection tool 62 and the other first target connection tool 61 is inserted into the axis-line-direction groove portion 62A of the other first connection tool 62. Accordingly, the electromagnetic valve can be assembled correctly. On the contrary, in a case where the electromagnetic valve is assembled while being shifted by 180°, for example, when one first target connection tool 61 is larger than the other first target connection tool 61 in structure size, one first target connection tool 61 cannot be inserted into the axis-line-direction groove portion 62A of the other first connection tool 62. Accordingly, the electromagnetic valve cannot be assembled. In this way, the hydraulic pressure control device (the oil pressure control device 4) of the modified example can have the same effect as that of the above-described example even when the plurality of first target connection tools 61 and the plurality of first connection tools 62 are provided to have different shapes. This idea can be also applied to a case where the erroneous assembly preventing mechanism is configured by the third connecting structure body 80 (the third target connection tool 81 and the third connection tool 82).

Although not illustrated in the drawings, the erroneous assembly preventing mechanism may include the first engagement portion and the second engagement portion which are formed so that the electromagnetic valve can be inserted in the axis line direction when the electromagnetic valve is deviated from the normal assembly position about the axis and the inserted electromagnetic valve cannot be rotated about the axis. The oil pressure control device 4 of the modified example can obtain the same effect as that of the above-described example even in such a configuration.

Although not illustrated in the drawings, the erroneous assembly preventing mechanism may be provided only to prevent the erroneous assembly. For example, the erroneous assembly preventing mechanism includes the first engagement portion that serves as a protrusion portion protruding from the electromagnetic valve and the second engagement portion that serves as a groove portion into which the first engagement portion is inserted only when the electromagnetic valve is located at the normal assembly position, wherein the first engagement portion is formed to be caught by the oil pressure circuit body or the connection body when the electromagnetic valve is located at a position other than the normal assembly position.

The connecting structure of an electromagnetic valve and the hydraulic pressure control device according to the embodiments includes the first connecting structure body, the second connecting structure body, and the third connecting structure body as described above and thus can prohibit a relative movement between the hydraulic pressure circuit body and the electromagnetic valve in all directions without using a fixing tool such as a bolt after the connection therebetween is completed. Then, the connecting structure of an electromagnetic valve and the hydraulic pressure control device can keep a predetermined connection strength between the hydraulic pressure circuit body and the electromagnetic valve with a simple configuration that does not need such a fixing tool even when an input load is applied to the electromagnetic valve from an outside in a traveling state. For this reason, the connecting structure of an electromagnetic valve and the hydraulic pressure control device can keep a predetermined connection state of the electromagnetic valve with respect to the hydraulic pressure circuit body with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connecting structure of an electromagnetic valve capable of adjusting a flow rate of a working fluid in a hydraulic pressure circuit to be accommodated into a columnar accommodation space of a hydraulic pressure circuit body including the hydraulic pressure circuit causing a working fluid of a control target to flow therethrough, and the accommodation space communicating the hydraulic pressure circuit with an outside, the connecting structure comprising:
    a first connecting structure body that prohibits a relative movement between the hydraulic pressure circuit body and the electromagnetic valve in an axis line direction of a center axis of the electromagnetic valve when a cylindrical or annular accommodation body of the electromagnetic valve is inserted in the axis line direction to be accommodated into the accommodation space of the hydraulic pressure circuit body and rotated about the center axis in a first direction relative to the hydraulic pressure circuit body;
    a second connecting structure body that prohibits a relative movement between the hydraulic pressure circuit body and the electromagnetic valve in a plane orthogonal to the axis line direction when the accommodation body is accommodated in the accommodation space;
    a third connecting structure body that prohibits a relative rotation in a second direction about the center axis between the hydraulic pressure circuit body and the electromagnetic valve when the accommodation body is accommodated in the accommodation space, and the second direction is opposite to the first direction; and
    a connection body that is prohibited from moving relatively to the hydraulic pressure circuit body, wherein
    the first connecting structure body includes a first target connection tool that is provided at one of the accommodation body and a wall portion constituting the accommodation space, and a first connection tool that is provided at the other thereof to lock the first target connection tool in the axis line direction when the accommodation body is accommodated in the accommodation space,
    the second connecting structure body includes a second target connection tool that is provided at one of the accommodation body and the wall portion constituting the accommodation space, and a second connection tool that is provided at the other thereof and prohibits a relative movement of the second target connection tool in a plane orthogonal to the axis line direction when the accommodation body is accommodated in the accommodation space,
    the third connecting structure body includes a third target connection tool that is provided at one of the connection body and the accommodation body, and a third connection tool that is provided at the other thereof and locks the third target connection tool when the accommodation body is accommodated in the accommodation space to prohibit the relative rotation in the second direction about the center axis of the electromagnetic valve with respect to the hydraulic pressure circuit body, and
    the third connecting structure body is located within the connection body.

2. The connecting structure of an electromagnetic valve according to claim 1, wherein
    the first target connection tool is a protrusion portion that protrudes from one of the accommodation body and the wall portion constituting the accommodation space, and
    the first connection tool is a groove portion that guides the first target connection tool in response to an operation in which the accommodation body is accommodated into the accommodation space and locks the first target connection tool in the axis line direction after the accommodation body is rotated in the first direction about the center axis in the accommodation body accommodating operation.

3. The connecting structure of an electromagnetic valve according to claim 2, wherein
    the third target connection tool is a protrusion portion that protrudes from one of the connection body and the accommodation body, and
    the third connection tool is a locking portion that locks the third target connection tool while being pressed together with third target connection tool by the third target connection tool when the accommodation body rotates in the first direction about the center axis such that the third connection tool and the third target connection tool stop rotation of the accommodation body in the second direction.

4. The connecting structure of an electromagnetic valve according to claim 2, wherein
    the hydraulic pressure circuit body is formed of a material having strength higher than that of the connection body.

5. The connecting structure of an electromagnetic valve according to claim 2, wherein
    the connection body includes a through-hole that overlaps the accommodation space so that the accommodation body is inserted therethrough, and a holding portion that holds a conductive member electrically connecting the electromagnetic valve to a controller configured to control a driving of the electromagnetic valve,
    the conductive member includes a valve contact point that is exposed to the through-hole, and
    the electromagnetic valve includes a valve-side contact point that comes into contact with the valve contact point when rotation of the accommodation body stops.

6. The connecting structure of an electromagnetic valve according to claim 2, further comprising:
    an erroneous assembly preventing mechanism that is provided between the electromagnetic valve and the hydraulic pressure circuit body or the connection body to prevent an erroneous assembly of the electromagnetic valve, wherein
    the erroneous assembly preventing mechanism includes a first engagement portion and a second engagement portion that are formed and arranged to engage with each other when the electromagnetic valve is assembled to a normal assembly position,
    the first engagement portion is provided at one of the electromagnetic valve and the hydraulic pressure circuit body or the connection body, and
    the second engagement portion is provided at the other of the electromagnetic valve and the hydraulic pressure circuit body or the connection body.

7. The connecting structure of an electromagnetic valve according to claim 1, wherein
the third target connection tool is a protrusion portion that protrudes from one of the connection body and the accommodation body, and
the third connection tool is a locking portion that locks the third target connection tool while being pressed together with third target connection tool by the third target connection tool when the accommodation body rotates in the first direction about the center axis such that the third connection tool and the third target connection tool stop rotation of the accommodation body in the second direction.

8. The connecting structure of an electromagnetic valve according to claim 1, wherein
the hydraulic pressure circuit body is formed of a material having strength higher than that of the connection body.

9. The connecting structure of an electromagnetic valve according to claim 1, wherein
the connection body includes a through-hole that overlaps the accommodation space so that the accommodation body is inserted therethrough, and a holding portion that holds a conductive member electrically connecting the electromagnetic valve to a controller configured to control a driving of the electromagnetic valve,
the conductive member includes a valve contact point that is exposed to the through-hole, and
the electromagnetic valve includes a valve-side contact point that comes into contact with the valve contact point when rotation of the accommodation body stops.

10. The connecting structure of an electromagnetic valve according to claim 1, further comprising:
an erroneous assembly preventing mechanism that is provided between the electromagnetic valve and the hydraulic pressure circuit body or the connection body to prevent an erroneous assembly of the electromagnetic valve, wherein
the erroneous assembly preventing mechanism includes a first engagement portion and a second engagement portion that are formed and arranged to engage with each other when the electromagnetic valve is assembled to a normal assembly position,
the first engagement portion is provided at one of the electromagnetic valve and the hydraulic pressure circuit body or the connection body, and
the second engagement portion is provided at the other of the electromagnetic valve and the hydraulic pressure circuit body or the connection body.

11. A connecting structure of an electromagnetic valve capable of adjusting a flow rate of a working fluid in a hydraulic pressure circuit to be accommodated into a columnar accommodation space of a hydraulic pressure circuit body including the hydraulic pressure circuit causing a working fluid of a control target to flow therethrough, and the accommodation space communicating the hydraulic pressure circuit with an outside, the connecting structure comprising:
at least two first connecting structure bodies that prohibit a relative movement between the hydraulic pressure circuit body and the electromagnetic valve in an axis line direction of a center axis of the electromagnetic valve when a cylindrical or annular accommodation body of the electromagnetic valve is inserted in the axis line direction to be accommodated into the accommodation space of the hydraulic pressure circuit body and rotated about the center axis in a first direction relative to the hydraulic pressure circuit body;
a second connecting structure body that prohibits a relative movement between the hydraulic pressure circuit body and the electromagnetic valve in a plane orthogonal to the axis line direction when the accommodation body is accommodated in the accommodation space;
at least two third connecting structure bodies that prohibit a relative rotation in a second direction about the center axis between the hydraulic pressure circuit body and the electromagnetic valve when the accommodation body is accommodated in the accommodation space, and the second direction is opposite to the first direction; and
a connection body that is prohibited from moving relatively to the hydraulic pressure circuit body, wherein
each of the at least two first connecting structure bodies includes a first target connection tool that is provided at one of the accommodation body and a wall portion constituting the accommodation space, and a first connection tool that is provided at the other thereof to lock the first target connection tool in the axis line direction when the accommodation body is accommodated in the accommodation space,
the second connecting structure body includes a second target connection tool that is provided at one of the accommodation body and the wall portion constituting the accommodation space, and a second connection tool that is provided at the other thereof and prohibits a relative movement of the second target connection tool in a plane orthogonal to the axis line direction when the accommodation body is accommodated in the accommodation space,
each of the at least two third connecting structure bodies includes a third target connection tool that is provided at one of the connection body and the accommodation body, and a third connection tool that is provided at the other thereof and locks the third target connection tool when the accommodation body is accommodated in the accommodation space to prohibit the relative rotation in the second direction about the center axis of the electromagnetic valve with respect to the hydraulic pressure circuit body, and
the third connecting structure bodies are located within the connection body.

12. The connecting structure of an electromagnetic valve according to claim 11, wherein
the first target connection tool is a protrusion portion that protrudes from one of the accommodation body and the wall portion constituting the accommodation space, and
the first connection tool is a groove portion that guides the first target connection tool in response to an operation in which the accommodation body is accommodated into the accommodation space and locks the first target connection tool in the axis line direction after the accommodation body is rotated in the first direction about the center axis in the accommodation body accommodating operation.

13. The connecting structure of an electromagnetic valve according to claim 12, wherein
the third target connection tool is a protrusion portion that protrudes from one of the connection body and the accommodation body, and
the third connection tool is a locking portion that locks the third target connection tool while being pressed together with third target connection tool by the third target connection tool when the accommodation body rotates in the first direction about the center axis such that the third connection tool and the third target connection tool stop rotation of the accommodation body in the second direction.

14. The connecting structure of an electromagnetic valve according to claim 12, wherein
the hydraulic pressure circuit body is formed of a material having strength higher than that of the connection body.

15. The connecting structure of an electromagnetic valve according to claim 12, wherein
the connection body includes a through-hole that overlaps the accommodation space so that the accommodation body is inserted therethrough, and a holding portion that holds a conductive member electrically connecting the electromagnetic valve to a controller configured to control a driving of the electromagnetic valve,
the conductive member includes a valve contact point that is exposed to the through-hole, and
the electromagnetic valve includes a valve-side contact point that comes into contact with the valve contact point when rotation of the accommodation body stops.

16. The connecting structure of an electromagnetic valve according to claim 11, wherein
the third target connection tool is a protrusion portion that protrudes from one of the connection body and the accommodation body, and
the third connection tool is a locking portion that locks the third target connection tool while being pressed together with third target connection tool by the third target connection tool when the accommodation body rotates in the first direction about the center axis such that the third connection tool and the third target connection tool stop rotation of the accommodation body in the second direction.

17. The connecting structure of an electromagnetic valve according to claim 11, wherein
the hydraulic pressure circuit body is formed of a material having strength higher than that of the connection body.

18. The connecting structure of an electromagnetic valve according to claim 11, wherein
the connection body includes a through-hole that overlaps the accommodation space so that the accommodation body is inserted therethrough, and a holding portion that holds a conductive member electrically connecting the electromagnetic valve to a controller configured to control a driving of the electromagnetic valve,
the conductive member includes a valve contact point that is exposed to the through-hole, and
the electromagnetic valve includes a valve-side contact point that comes into contact with the valve contact point when rotation of the accommodation body stops.

19. The connecting structure of an electromagnetic valve according to claim 11, further comprising:
an erroneous assembly preventing mechanism that is provided between the electromagnetic valve and the hydraulic pressure circuit body or the connection body to prevent an erroneous assembly of the electromagnetic valve, wherein
the erroneous assembly preventing mechanism includes a first engagement portion and a second engagement portion that are formed and arranged to engage with each other when the electromagnetic valve is assembled to a normal assembly position,
the first engagement portion is provided at one of the electromagnetic valve and the hydraulic pressure circuit body or the connection body, and
the second engagement portion is provided at the other of the electromagnetic valve and the hydraulic pressure circuit body or the connection body.

20. A hydraulic pressure control device comprising:
a hydraulic pressure circuit body that includes a hydraulic pressure circuit causing a working fluid of a control target to flow therethrough, and a columnar accommodation space communicating the hydraulic pressure circuit with an outside;
a controller configured to control a flow rate of the working fluid in the hydraulic pressure circuit;
an electromagnetic valve that is connected to the hydraulic pressure circuit body while a cylindrical or an annular accommodation body is inserted in an axis line direction of a center axis to be accommodated into the accommodation space and is controlled by the controller to be driven so that the flow rate of the working fluid in the hydraulic pressure circuit is adjusted;
a connection body that is prohibited from moving relatively to the hydraulic pressure circuit body;
a first connecting structure body that prohibits a relative movement between the hydraulic pressure circuit body and the electromagnetic valve in the axis line direction when the accommodation body is inserted in the accommodation space and rotated about the center axis in a first direction relative to the hydraulic pressure circuit body;
a second connecting structure body that prohibits a relative movement between the hydraulic pressure circuit body and the electromagnetic valve in a plane orthogonal to the axis line direction when the accommodation body is accommodated in the accommodation space; and
a third connecting structure body that prohibits a relative rotation in a second direction about the center axis between the hydraulic pressure circuit body and the electromagnetic valve when the accommodation body is accommodated in the accommodation space, and the second direction is opposite to the first direction, wherein
the first connecting structure body includes a first target connection tool that is provided at one of the accommodation body and a wall portion constituting the accommodation space, and a first connection tool that is provided at the other thereof to lock the first target connection tool in the axis line direction when the accommodation body is accommodated in the accommodation space,
the second connecting structure body includes a second target connection tool that is provided at one of the accommodation body and the wall portion constituting the accommodation space, and a second connection tool that is provided at the other thereof and prohibits a relative movement of the second target connection tool in a plane orthogonal to the axis line direction when the accommodation body is accommodated in the accommodation space,
the third connecting structure body includes a third target connection tool that is provided at one of the connection body and the accommodation body, and a third connection tool that is provided at the other thereof and locks the third target connection tool when the accommodation body is accommodated in the accommodation space to prohibit the relative rotation in the second direction about the center axis of the electromagnetic valve with respect to the hydraulic pressure circuit body, and the third connecting structure body is located within the connection body.

* * * * *